United States Patent
Takeda et al.

(10) Patent No.: US 11,930,489 B2
(45) Date of Patent: Mar. 12, 2024

(54) OVERLAPPING PUCCH AND PUSCH TRANSMISSION

(71) Applicant: QUALCOMM Incorporated, San Diego, CA (US)

(72) Inventors: Kazuki Takeda, Tokyo (JP); Mostafa Khoshnevisan, San Diego, CA (US); Seyedkianoush Hosseini, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 284 days.

(21) Appl. No.: 17/174,198

(22) Filed: Feb. 11, 2021

(65) Prior Publication Data

US 2021/0258993 A1 Aug. 19, 2021

Related U.S. Application Data

(60) Provisional application No. 62/977,026, filed on Feb. 14, 2020.

(51) Int. Cl.
*H04W 72/1268* (2023.01)
*H04W 72/0446* (2023.01)
(Continued)

(52) U.S. Cl.
CPC ... *H04W 72/1268* (2013.01); *H04W 72/0446* (2013.01); *H04W 72/21* (2023.01); *H04W 76/27* (2018.02)

(58) Field of Classification Search
CPC . H04W 72/1268; H04W 76/27; H04W 72/21; H04W 72/0446
See application file for complete search history.

(56) References Cited

U.S. PATENT DOCUMENTS

| | | | |
|---|---|---|---|
| 2018/0084540 A1* | 3/2018 | Takeda | H04W 72/21 |
| 2019/0191453 A1* | 6/2019 | Xiong | H04L 5/0037 |

(Continued)

FOREIGN PATENT DOCUMENTS

EP 3280205 A1 2/2018

OTHER PUBLICATIONS

Huawei, et al., "Feature Summary of Enhancements on Multi-TRP/Panel Transmission", 3GPP Draft, 3GPP TSG RAN WG1 Meeting #99, R1-1913299, Nov. 18-22, 2019, Nov. 25, 2019, 88 Pages, XP051830596.

(Continued)

*Primary Examiner* — Basil Ma
(74) *Attorney, Agent, or Firm* — Shumaker & Sieffert, P. A.

(57) ABSTRACT

Aspects of this disclosure provide methods, devices and systems for concurrently transmitting control information and data information. In some more specific aspects, a base station may transmit one or more parameters to a user equipment (UE) that indicate to the UE to refrain from transmitting uplink control information together with uplink data information in an uplink data channel. Instead, the one or more parameters may configure the UE to transmit the uplink control information and the uplink data information using overlapping resources in different channels. In some more specific aspects, the UE may transmit the uplink control information in a slot of an uplink control channel and transmit the uplink data information in a slot of the uplink data channel that at least partially overlaps with the slot of the uplink control channel.

22 Claims, 15 Drawing Sheets

(51) Int. Cl.
*H04W 72/21* (2023.01)
*H04W 76/27* (2018.01)

(56) References Cited

U.S. PATENT DOCUMENTS

| | | | |
|---|---|---|---|
| 2019/0230683 A1* | 7/2019 | Akkarakaran | H04L 5/0053 |
| 2019/0239196 A1* | 8/2019 | Lee | H04L 5/00 |
| 2019/0306922 A1* | 10/2019 | Xiong | H04W 72/566 |
| 2022/0007410 A1* | 1/2022 | Cirik | H04L 5/0078 |
| 2022/0225360 A1* | 7/2022 | Yi | H04W 72/23 |

OTHER PUBLICATIONS

International Search Report and Written Opinion—PCT/US2021/017994—ISA/EPO—dated Jan. 14, 2022.

* cited by examiner

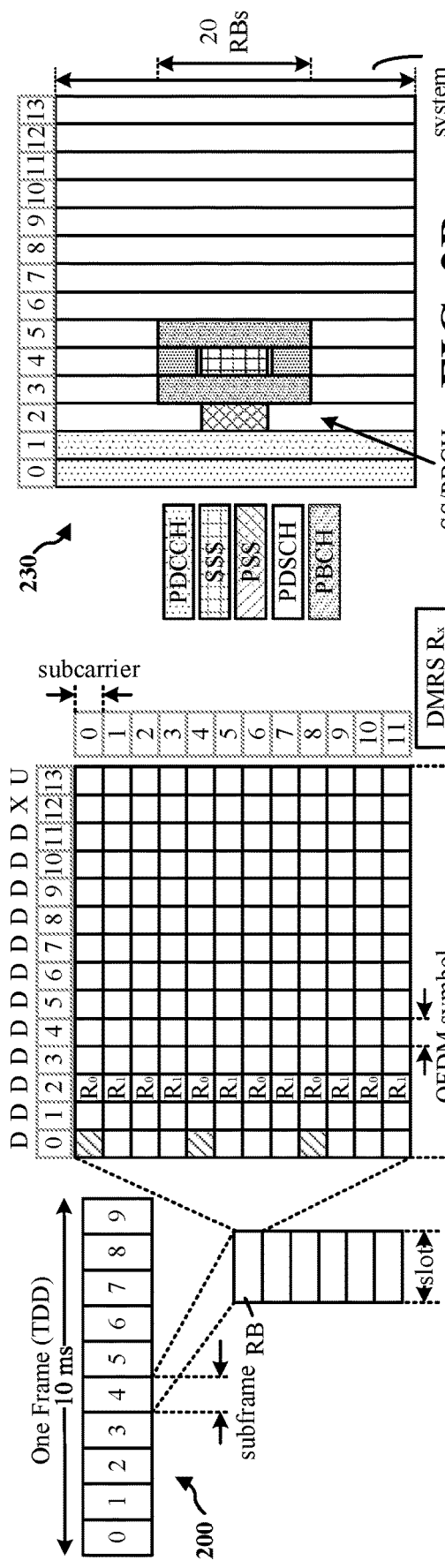
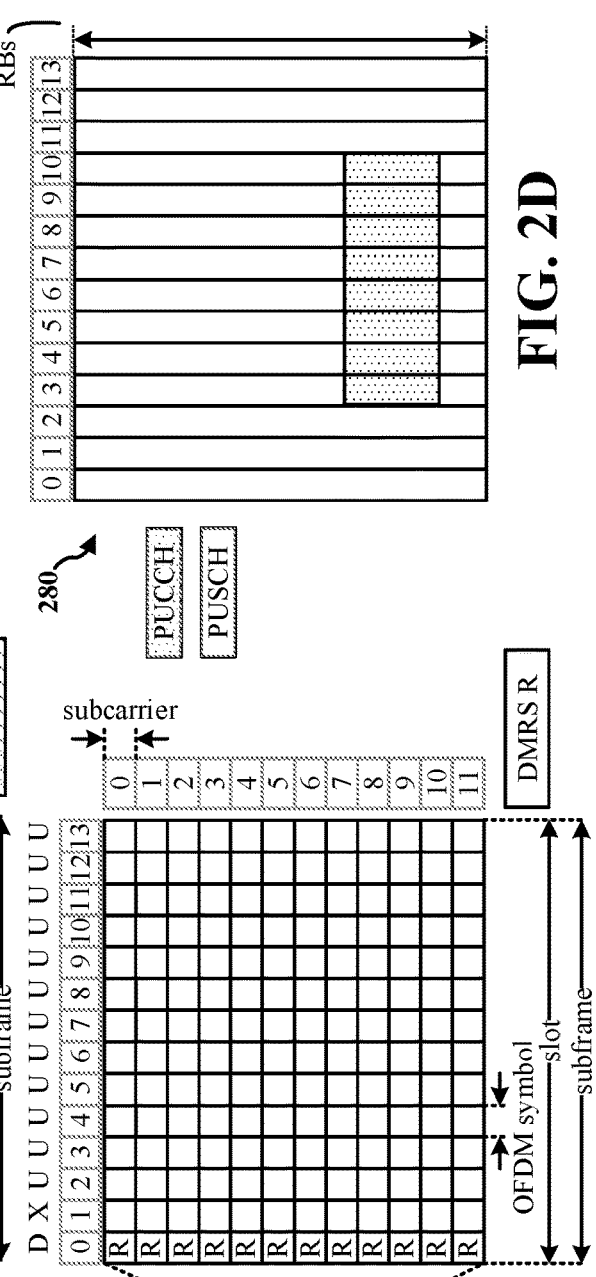
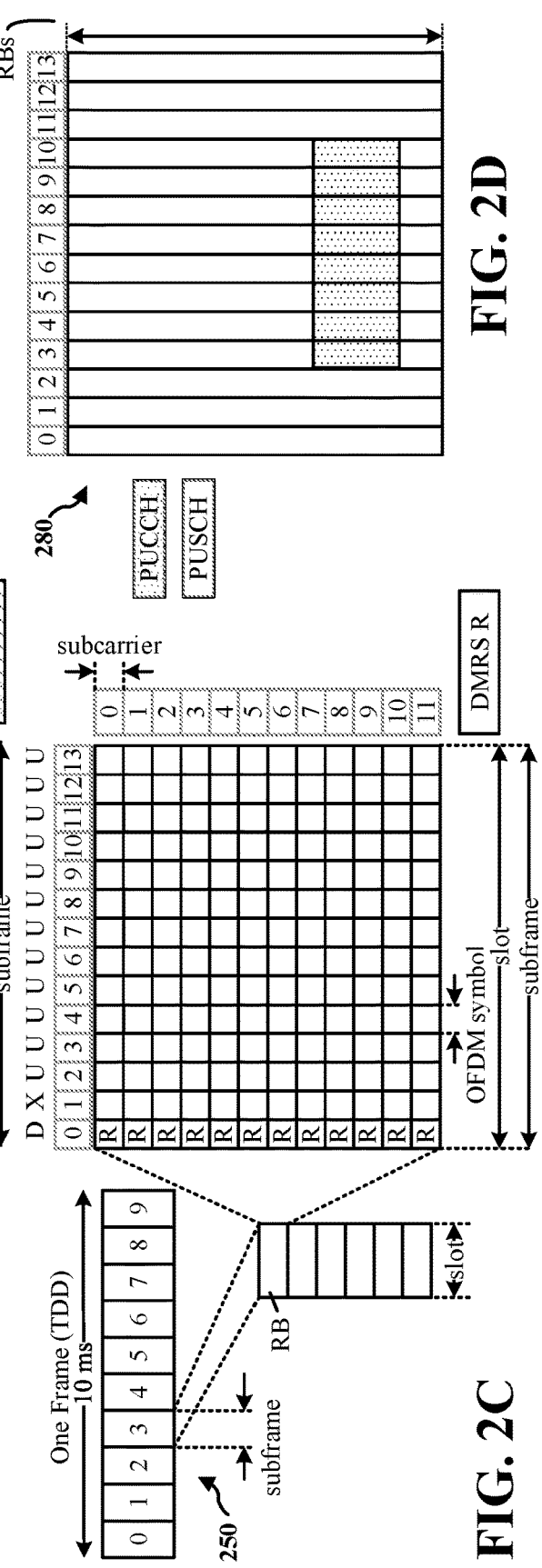
FIG. 2A
FIG. 2B
FIG. 2C
FIG. 2D

OVERLAPPING PUCCH AND PUSCH TRANSMISSION

CROSS-REFERENCE TO RELATED APPLICATIONS

The present application claims priority to and the benefit of U.S. Provisional Application No. 62/977,026 filed on Feb. 14, 2020, entitled "Overlapping PUCCH and PUSCH Transmission," the contents of which are hereby incorporated by reference in their entireties.

BACKGROUND

Technical Field

The present disclosure relates generally to wireless communication, and more particularly, to the overlapping transmission of data information and control information.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. For example, during a communication session, the UE may be scheduled to concurrently transmit uplink control information and uplink data information within a cell group. The current wireless communication technology may not support the concurrent control/data transmissions. Instead, the UE may "piggy-back" the control information onto uplink data transmissions. However, for certain types of uplink carrier aggregation, it may be desirable to allocate some cells for data transmission without any control information appended. Therefore, improvements in concurrent transmission of data information and control information in a cell group may be desirable.

SUMMARY

Improvements are presented herein. Although discussed primarily in the context of 5G NR technology or standards, these improvements may be applicable to other multi-access technologies and the telecommunication standards that employ these technologies. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the present disclosure can be implemented in a method that includes receiving a radio resource control (RRC) parameter that indicates to the user equipment (UE) to refrain from transmitting control information in an uplink data channel during an overlapping transmission of the uplink data channel and an uplink control channel, configuring the uplink data channel and the uplink control channel for the overlapping transmission based on the RRC parameter, transmitting the control information in a first slot of the uplink control channel, and transmitting data information in a second slot of the uplink data channel, the second slot at least partially overlapping with the first slot.

Another innovative aspect of the present disclosure can be implemented in a wireless communication device (for example, a UE) that includes one or more processors and a memory including instructions that, when executed by the one or more processors, cause or enable the wireless communication device to receive a radio resource control (RRC) parameter that indicates to the UE to refrain from transmitting control information in an uplink data channel during an overlapping transmission of the uplink data channel and an uplink control channel, configure the uplink data channel and the uplink control channel for the overlapping transmission based on the RRC parameter, transmit the control information in a first slot of the uplink control channel, and transmit data information in a second slot of the uplink data channel, the second slot at least partially overlapping with the first slot.

Aspects of the present disclosure includes a method of wireless communication at a UE including receiving a RRC configuration including one or more RRC parameters that indicate to the UE to refrain from transmitting control information in an uplink data channel during an overlapping transmission of the uplink data channel and an uplink control channel, configuring the uplink data channel and the uplink control channel for the overlapping transmission based on the one or more RRC parameters, transmitting the control information in a first slot of the uplink control channel, and transmitting data information in a second slot of the uplink data channel, the second slot at least partially overlapping with the first slot.

In the method above, wherein the control information includes uplink control information (UCI), the uplink control channel includes a physical uplink control channel (PUCCH), and the uplink data channel includes a physical uplink shared channel (PUSCH).

In any of the method above, wherein the one or more RRC parameters indicate one or more uplink carriers are one or more uplink data carriers, a group of uplink carriers is a group of uplink data carriers, or a first cell includes the one or more uplink data carriers, wherein the first cell is different than a second cell associated with the uplink control channel.

In any of the method above, wherein the uplink control channel is associated with a first cell and the uplink data channel is associated with a second cell different than the first cell.

In any of the method above, further comprising receiving a first control resource set (CORESET) having a first CORESET index and a second CORESET having a second CORESET index, detecting a first downlink control information (DCI) format in a first physical downlink control channel (PDCCH) received in the first CORESET and a second DCI format in a second PDCCH received in the second CORESET, triggering the transmission of the uplink control channel associated with the first cell based on detecting the first DCI format, and triggering the transmission of the uplink data channel associated with the second cell based on detecting the second DCI format.

In any of the method above, wherein the first cell is a Primary Cell (PCell) and the second cell is a Secondary Cell (SCell).

In any of the method above, wherein the first cell is a Primary Secondary Cell (PSCell) and the second cell is a SCell.

In any of the method above, further comprising transmitting second control information in a third slot via the second cell, wherein the control information is first control information.

In any of the method above, wherein transmitting the second control information comprises transmitting the second control information in the uplink data channel, wherein the second slot and the third slot at least partially overlaps with the first slot.

In any of the method above, wherein the second slot and the third slot are the same slot.

In any of the method above, wherein transmitting the second control information further comprises transmitting the second control information in the uplink control channel, wherein the second slot at least partially overlaps with the first slot and with the third slot.

Aspects of the present disclosure includes a UE for wireless communication having a memory and one or more processors coupled to the memory and configured to receive a RRC configuration including one or more RRC parameters that indicate to the UE to refrain from transmitting control information in an uplink data channel during an overlapping transmission of the uplink data channel and an uplink control channel, configure the uplink data channel and the uplink control channel for the overlapping transmission based on the one or more RRC parameters, transmit the control information in a first slot of the uplink control channel, and transmit data information in a second slot of the uplink data channel, the second slot at least partially overlapping with the first slot.

In the UE above, wherein the control information includes UCI, the uplink control channel includes a PUCCH, and the uplink data channel includes a PUSCH.

In any of the UE above, wherein the one or more RRC parameters indicate one or more uplink carriers are one or more uplink data carriers, a group of uplink carriers is a group of uplink data carriers, or a first cell includes the one or more uplink data carriers, wherein the first cell is different than a second cell associated with the uplink control channel.

In any of the UE above, wherein the uplink control channel is associated with a first cell and the uplink data channel is associated with a second cell different than the first cell.

In any of the UE above, wherein the one or more processors are further configured to receive a first control resource set (CORESET) having a first CORESET index and a second CORESET having a second CORESET index, detect a first DCI format in a first physical downlink control channel (PDCCH) received in the first CORESET and a second DCI format in a second PDCCH received in the second CORESET, trigger the transmission of uplink control channel associated with the first cell based on detecting the first DCI format, and trigger the transmission of the uplink data channel associated with the second cell based on detecting the second DCI format.

In any of the UE above, wherein the first cell is a Primary Cell (PCell) and the second cell is a Secondary Cell (SCell).

In any of the UE above, wherein the first cell is a Primary Secondary Cell (PSCell) and the second cell is a SCell.

In any of the UE above, wherein the one or more processors are further configured to transmit second control information in a third slot via the second cell, wherein the control information is first control information.

In any of the UE above, wherein transmitting the second control information comprises transmitting the second control information in the uplink data channel, wherein the second slot and the third slot at least partially overlaps with the first slot.

In any of the UE above, wherein the second slot and the third slot are the same slot.

In any of the UE above, wherein transmitting the second control information further comprises transmitting the second control information in the uplink control channel, wherein the second slot at least partially overlaps with the first slot and with the third slot.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, aspects of which may be used to implement transmission, by a user equipment (UE), or reception, by a base station, of overlapping control information on an uplink control channel and data information on an uplink data channel.

DETAILED DESCRIPTION

Figure 1:
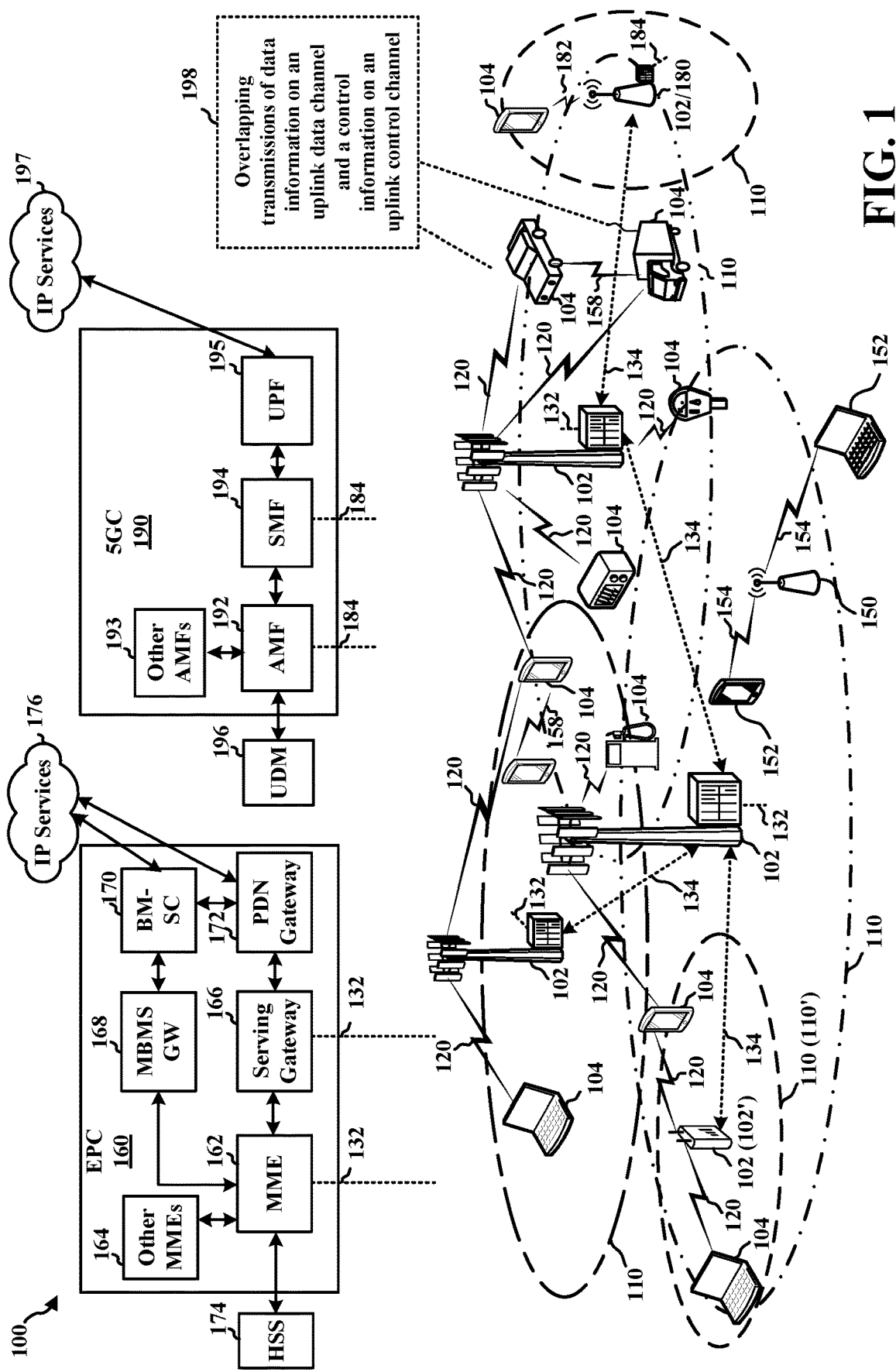
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

In a traditional communication network, a base station or other network node may schedule a user equipment (UE) to transmit control information using resources allocated for the transmission of data information in an uplink data channel, such as a physical uplink shared channel (PUSCH). For example, the UE may be scheduled to append the control information onto the uplink data channel. However, in some instances, it may be desirable to allocate all the carriers in a cell for data transmission only, without any control information appended. For example, when using inter-frequency range (inter-FR) carrier aggregation (where one carrier is transmitted in a sub-6 gigahertz (GHz) band and another carrier is transmitted in a millimeter wave (mmWave) band), it may be desirable to allocate all carriers in a cell for uplink data transmissions only. In another example, when the UE is operating in an unlicensed spectrum (such as for License Assisted Access (LAA) operation), it may be desirable to allocate all carriers in a cell for uplink data transmission only.

Various aspects of the present disclosure relate generally to the overlapping transmission of control information and data information. Some aspects more specifically relate to the overlapping transmission, by a UE, of control information on an uplink control channel and data information on an uplink data channel. In other words, at least one slot carrying the control information may overlap, partially or fully, with at least one slot carrying the data information. In some examples, a base station or other network node may transmit a radio resource control (RRC) parameter to indicate to the UE to refrain from transmitting the control information on the uplink data channel. In response to receiving the RRC parameter, the UE may refrain from transmitting the control information with the data information in the uplink data channel, and instead, concurrently transmit the control information in an uplink control channel associated with a first cell and the data information in the uplink data channel associated with a different second cell. In some examples, the UE may transmit the data information or the control information to multiple base stations.

Particular aspects of the subject matter described in this disclosure can be implemented to realize one or more of the following potential advantages. In some aspects, the described techniques can be used to provide an option to disable or prevent a UE from appending control information onto an uplink data channel. As a result, the complexity in receiving the control information and the data information at the UE may be reduced. Similarly, the described techniques also can be used to limit the uplink data channel for data information transmission only, and as a result, increase throughput or reduce latency. In some aspects, the described techniques may improve uplink coverage for control signaling by permitting the concurrent transmissions of data and control information. For example, the UE may transmit uplink control information to multiple base stations or multiple cells concurrently within a slot without the requirement of appending the control information to a data channel scheduled to be transmitted to a base station or a cell.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 and base station 180 may be configured to perform overlapping transmissions of data information on an uplink data channel and a control information on an uplink control channel (see block 198), as is described in more detail below. Although the following description may be focused on 5G NR, the concepts described herein may be applicable to other similar areas, such as LTE, LTE-A, CDMA, GSM, and other wireless technologies.

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, aspects of which may be used to implement transmission, by the UE, or reception, by the base station, of overlapping control information on an uplink control channel and data information on an uplink data channel. In particular, FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK) or negative acknowledgement (NACK) feedback. The PUSCH carries data, and may additionally be used to carry a buffer status report (BSR), a power headroom report (PHR), or UCI.

Figure 3:
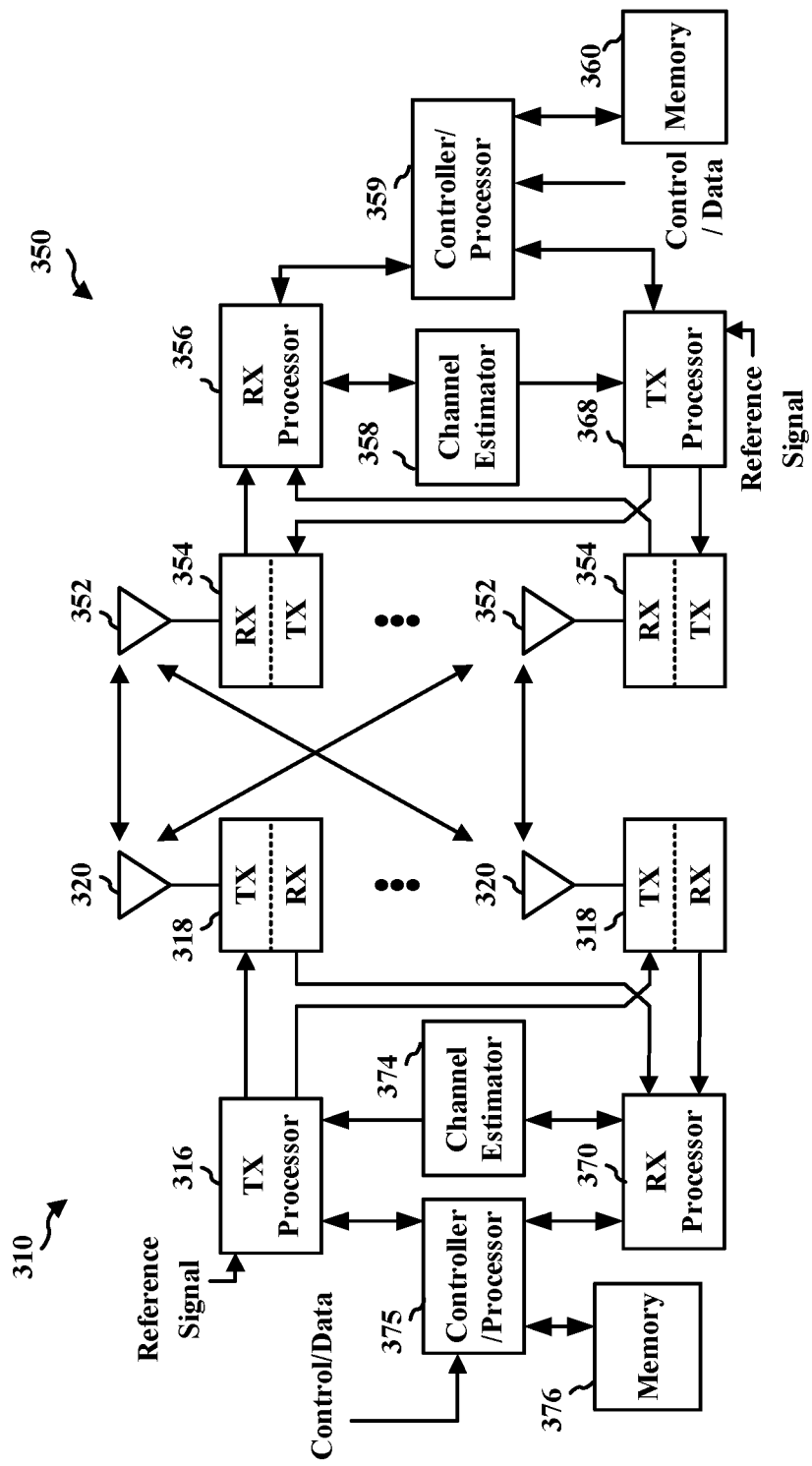
FIG. 3 is a diagram illustrating an example of the base station and the UE in an access network, including components that may be configured to implement transmission, by the UE, or reception, by the base station, of overlapping control information on an uplink control channel and data information on an uplink data channel.

FIG. 3 is a block diagram of a base station 310 in communication with a UE 350 in an access network, including components that may be configured to implement transmission, by the UE, or reception, by the base station, of overlapping control information on an uplink control channel and data information on an uplink data channel. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

With respect to the UE 350, at least one of the TX processor 368, the RX processor 356, and the controller/processor 359 may be configured to perform aspects in connection with the overlapping transmissions of data information on an uplink data channel and a control information on an uplink control channel (block 198 of FIG. 1).

With respect to the base station 310, at least one of the TX processor 316, the RX processor 370, and the controller/processor 375 may be configured to perform aspects in connection with the overlapping transmissions of data information on an uplink data channel and a control information on an uplink control channel received from the UE (block 198 of FIG. 1).

In some instances, it may be desirable to transmit control information and data information using overlapping resources on an uplink control channel and an uplink data channel. Prior to the present disclosure, however, the base station or a wireless communication standard may restrict the UE to transmit the control information on uplink data channel along with the data information. Therefore, it may be advantageous to provide signaling capabilities for the UE to transmit the control information on the uplink control channel. For example, in an aspect, the present disclosure enables the UE to send overlapping transmissions of data information on an uplink data channel and a control information on an uplink control channel, which has been found to improve uplink coverage for control signaling in an uplink carrier aggregation (CA) scenario.

Further, in an aspect, the present disclosure provides a radio resource control (RRC) configuration to enable at least overlapping, and in some cases simultaneous, uplink control and data transmissions, such as physical uplink control channel (PUCCH) and physical uplink shared channel (PUSCH) transmissions across carriers.

In an aspect, the present solution includes RRC parameters and related UE procedures for the overlapping transmissions of data information on an uplink data channel and a control information on an uplink control channel. As used herein the terminology "uplink (UL) data carrier" is used to denote the UL carrier where the PUSCH does not multiplex HARQ-ACK or periodic channel state information (P-CSI) in the PUCCH.

For example, in an option, an aspect introduces a 1-bit RRC parameter per UL carrier to inform the UL carrier(s) is the UL data carrier(s). Once configured, UCI of the PUCCH will not be multiplexed on a PUSCH on the UL carrier. For a supplemental uplink (SUL) carrier, one serving cell could have two UL carriers (UL+SUL)—in which case the 1-bit RRC parameter can be per UL/SUL carrier.

For example, in another option, an aspect introduces 1-bit RRC parameter per group of UL carriers to inform the group of UL carriers is the group of UL data carriers. Once configured, UCI of the PUCCH will not be multiplexed on a PUSCH in the group of UL carriers. Also, in this case, the per group of UL carriers can be per band, per FR, per TA-group, per cell-group/PUCCH-group, or per UE. Also, in this case, compared to the prior option, signaling overhead can be reduced.

For example, in a further option, an aspect introduces 1-bit RRC parameter per cell-group/PUCCH-group to inform the SCell(s) in the bands other than the one for P(S)Cell/PUCCH-SCell in the cell-group/PUCCH-group are the UL data carrier(s). Once configured, UCI of the PUCCH will not be multiplexed on a PUSCH in any of the SCell(s) that is in different band from the P(S)Cell/PUCCH-SCell.

Moreover, the present disclosure may be applied to multiple transmit and receive point (multi-TRP or M-TRP) architectures.

For example, in an option, an aspect includes overlapping or simultaneous PUCCH-PUSCH across the same CORESETPoolIndex. Alternatively, another option includes overlapping or simultaneous PUCCH-PUSCH across different CORESETPoolIndex. For instance, between the same CORESETPoolIndex, UCI on PUCCH is piggybacked to PUSCH. A further option includes overlapping or simultaneous PUCCH-PUSCH across same and different CORESETPoolIndex, regardless of whether the same or different CORESETPoolIndex, PUCCH and PUSCH are simultaneously transmitted.

Figure 4:
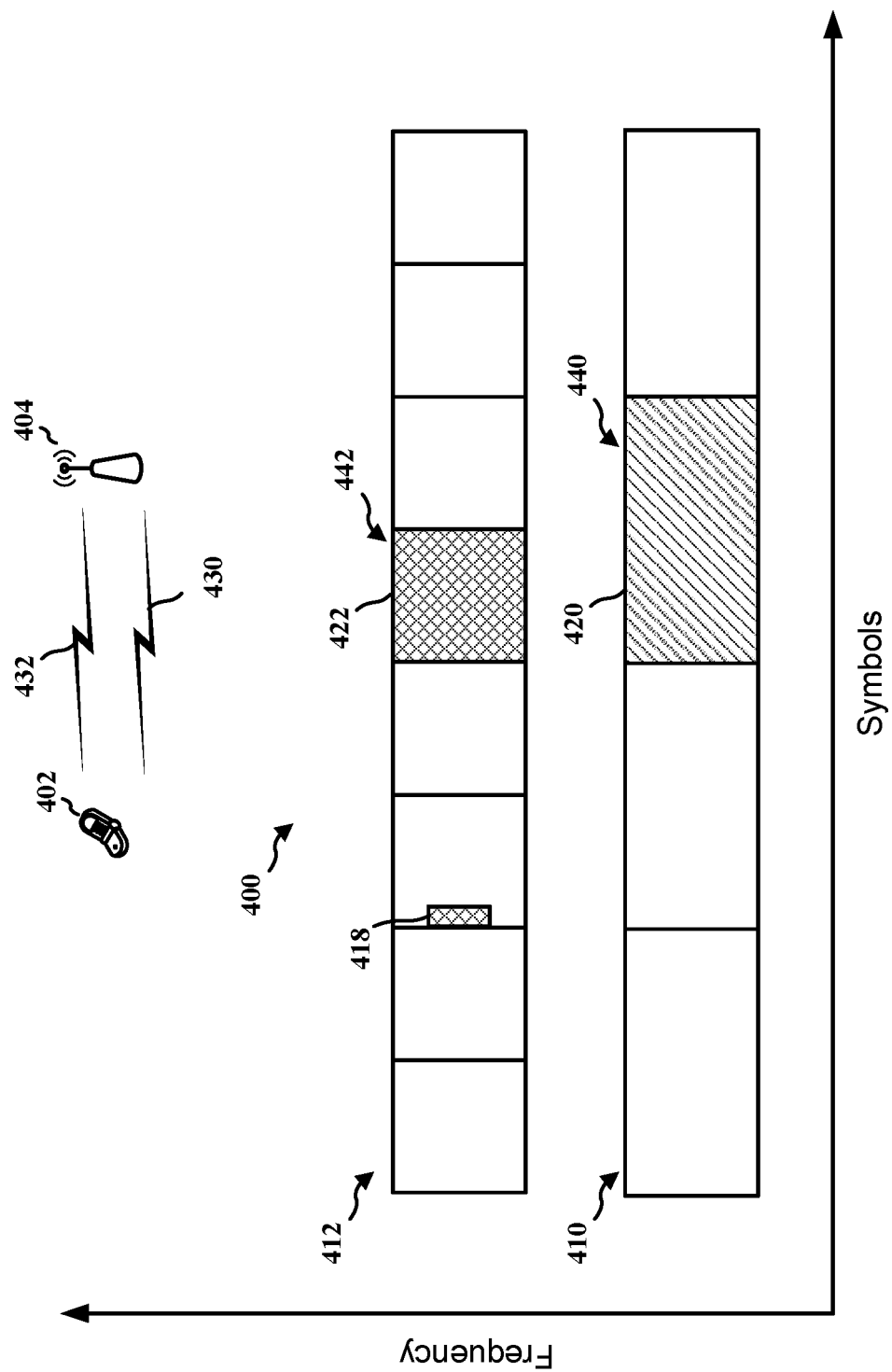
FIG. 4 is a graph of frequency relative to symbols including an example of overlapping transmission of control information on an uplink control channel and data information on an uplink data channel, including an inset schematic diagram representing the transmissions between the UE and the base station.

FIG. 4 is a graph of frequency relative to symbols including an example of overlapping transmission of control information on an uplink (UL) control channel and data information on an UL data channel, including an inset schematic diagram representing the transmissions between the UE and the base station. In particular, FIG. 4 illustrates an example of an overlapping transmission 400 by a UE 402 to a base station 404, such as a gNB or eNB. In particular, the UE 402 transmits an overlapping transmission 400 that includes data information 432 on an UL data channel 422 and control information 430 on an UL control channel 420. In some aspects, the base station 404 may allocate at least a portion of a first set of resources 410 associated with a first cell or at least a portion of a second set of resources 412 associated with a second cell to the UE 402 for UL transmission. In some aspects, the first cell may operate on a first component carrier (CC), for example, a PCell. The first cell may have a first subcarrier spacing, such as 15 kilohertz (kHz), among other example subcarrier spacings. The second cell may operate on a second CC, for example, a SCell. The second cell may have a second different subcarrier spacing, such as 30 kHz, among other example subcarrier spacings.

During operation, the base station 404 may transmit a downlink control information (DCI) for a DL assignment or for an UL grant 418 to the UE 402 indicating that the UE 402 is authorized to transmit the control information 430 or the data information 432. The DCI 418 may include resource allocation information. For example, the DCI 418 may indicate to the UE 402 to transmit the control information 430 on the UL control channel 420 and the data information 432 on the UL data channel 422. The UE 402, in response to receiving the UL grant in the DCI 418, may transmit the control information 430 on the UL control channel 420 and the data information 432 on the UL data channel 422. In some aspects, at least one slot 440 in the UL control channel 420 may overlap, in symbol, partially or fully, with at least one slot 442 in the UL data channel 422. In some examples, the UL control channel 420 may be a PUCCH and the UL data channel 422 may be a PUSCH. In some examples, the control information 430 may include HARQ ACK/NACK feedback, channel state information (CSI), p-CSI, a scheduling request, a channel quality indicator, or other control information. Notably, the control information 430 may be associated with the UL control channel 420 or the UL data channel 422.

Figure 5:
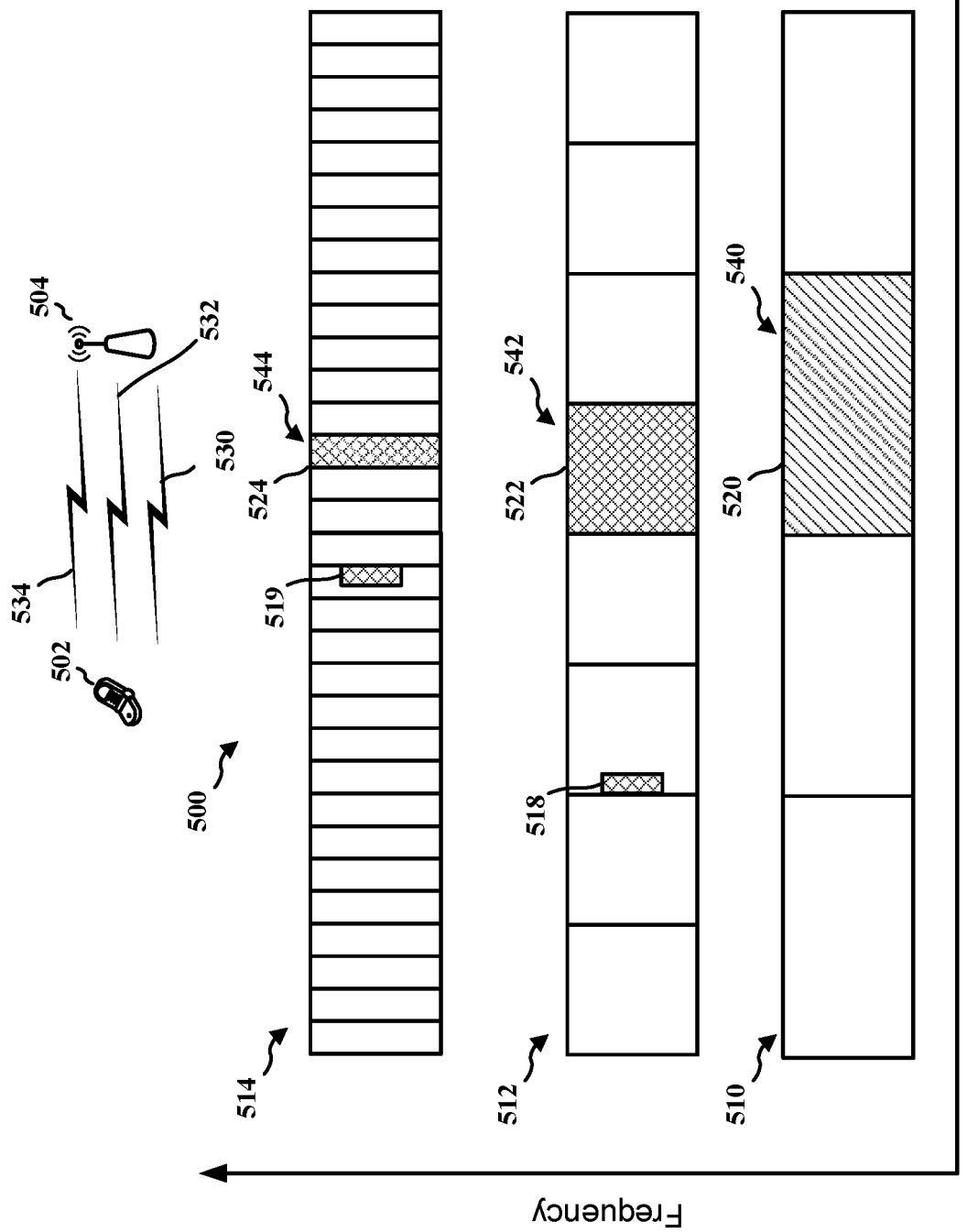
FIG. 5 is a graph of frequency relative to symbols including an example of overlapping transmission of control information on an uplink control channel and data information on multiple uplink data channels, including an inset schematic diagram representing the transmissions between the UE and the base station.

FIG. 5 is a graph of frequency relative to symbols including an example of overlapping transmission of control information on an UL control channel and data information on multiple UL data channels, including an inset schematic diagram representing the transmissions between the UE and the base station. In particular, FIG. 5 illustrates an example of an overlapping transmission 500 by a UE 502 to a base station 504, such as a gNB or eNB. In particular, the UE 402 transmits an overlapping transmission 500 that includes first data information 532 on a first UL data channel 522, second data information 534 on a second UL data channel 524, and control information 530 on an UL control channel 520. In some aspects, the base station 504 may allocate at least a portion of a first set of resources 510 associated with a first cell, at least a portion of a second set of resources 512 associated with a second cell, or at least a portion of a third set of resources 514 associated with a third cell to the UE 502 for UL transmission. The first cell may operate on a first component carrier, which may be a PCell. The first cell may have a first subcarrier spacing, such as 15 kilohertz (kHz), among other example subcarrier spacings. The second cell may operate on a second component carrier, which may be a SCell. The second cell may have a second subcarrier spacing, such as 30 kHz, among other example subcarrier spacings. The third cell may operate on a third component carrier, which also be a SCell. The third cell may have a third subcarrier spacing, such as 120 kHz, among other example subcarrier spacings.

During operation, the base station 504 may transmit a first UL grant 518 to the UE 502 indicating that the UE 502 is authorized to transmit the control information 530 or the first data information 532. The UL grant 518 may include resource allocation information. For example, the first UL grant 518 may indicate to the UE 502 to transmit the control information 530 on the UL control channel 520 and the first data information 532 on the first UL data channel 522. The second UL grant 519 may indicate to the UE 502 to transmit the control information 530 on the UL control channel 520 and the second data information 534 on the second UL data channel 524. The UE 502, in response to receiving the first UL grant 518, may transmit the control information 530 on the UL control channel 520 and the first data information 532 on the first UL data channel 522. In some aspects, at least a first slot 540 in the UL control channel 520 may overlap, in symbol, partially or fully, with at least a second slot 542 in the first UL data channel 522. The UE 502, in response to receiving the second UL grant 519, may transmit the control information 530 on the UL control channel 520 and the second data information 534 on the second UL data channel 524. In some aspects, at least the slot 540 in the UL control channel 520 may overlap, in symbol, partially or fully, with at least a third slot 544 in the second UL data channel 524. In some examples, the UL control channel 520 may be a PUCCH, the first UL data channel 522 may be a PUSCH, and the second UL data channel 522 may be a PUSCH. The control information 530 may include HARQ ACK/NACK feedback, channel state information (CSI), p-CSI, a scheduling request, channel quality indicator, or other control information. The control information 530 may be associated with the UL control channel 520, the first UL data channel 522, or the second UL data channel 524.

While FIG. 5 illustrates the overlapping transmission of two data channels and one control channel, the UE 520 may also perform overlapping transmissions of other numbers of data channels or control channels according to aspects of the present disclosure.

Figure 6:
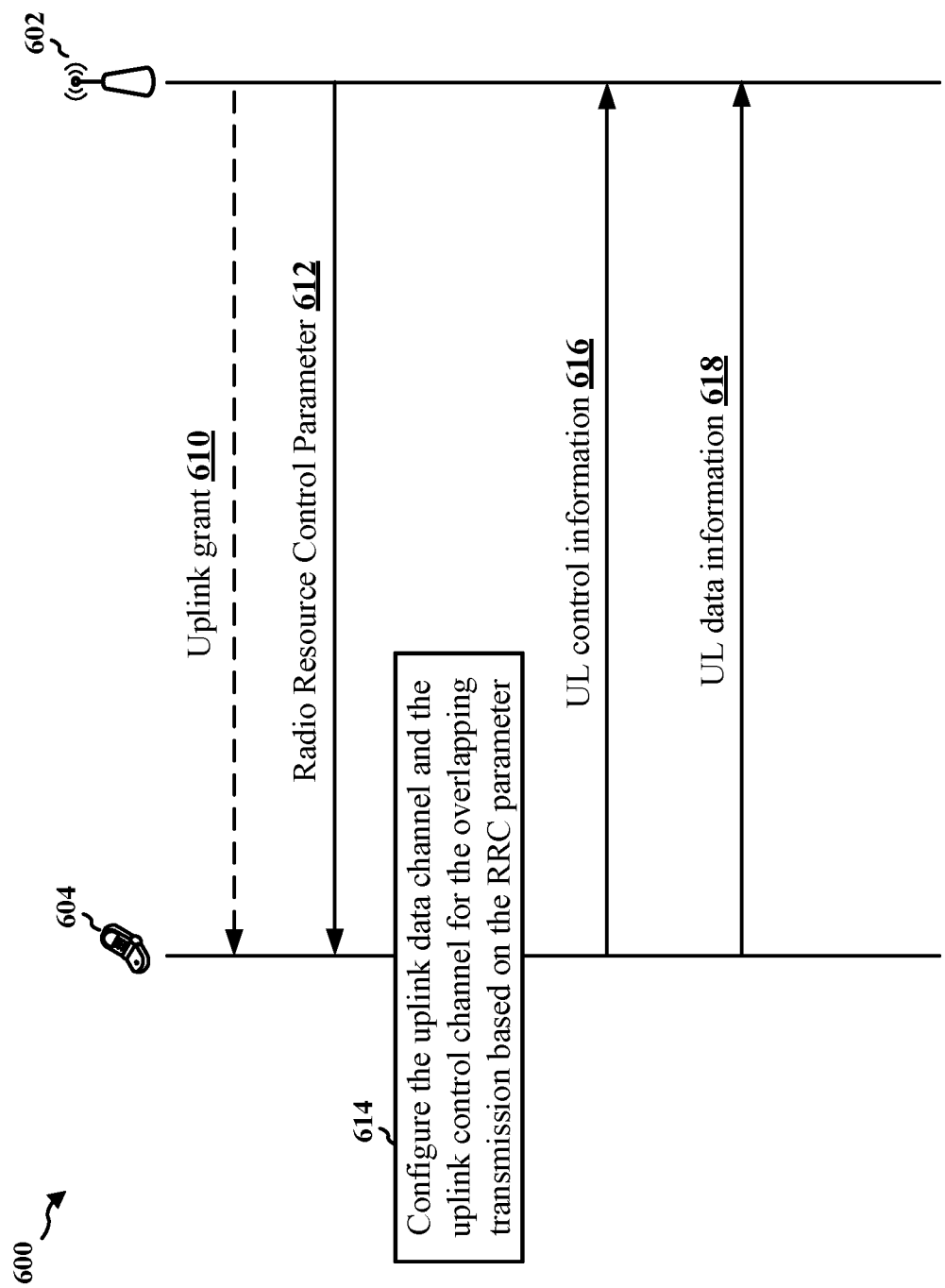
FIG. 6 is a communication flow between a base station and a UE that supports overlapping transmission of data information and control information in accordance with aspects of the present disclosure.

FIG. 6 shows an example communication flow 600 between a base station 602 and a UE 604 that supports overlapping transmissions of data information and control information in accordance with aspects of the present disclosure. In particular, the communication flow 600 illustrates the overlapping transmissions of data information on an UL data channel, such as a PUSCH, and control information on an UL control channel, such as a PUCCH. The base station 602, which may be a gNB or eNB, and the UE 604 may be configured to communicate in a RAN according to one or more standards defined for the RAN, such as one or more 3GPP standards defined for 5G NR.

In some aspects, the base station 602 may optionally transmit a DCI 610 to the UE 604. The DCI 610 may indicate that the UE 604 is authorized to transmit the control information or the data information. The DCI 610 may include resource allocation information.

In an aspects, the base station 602 may transmit a RRC parameter 612 to the UE 604. The RRC parameter 612 may include one or more bits indicating to the UE 604 to refrain from transmitting the control information in an UL data channel during an overlapping transmission of the UL data channel with the UL control channel. In a first example, the RRC parameter 612 may be associated with a UL carrier. The RRC parameter 612 may indicate to the UE 604 to not multiplex the control information of the UL control channel on the UL data channel on the UL carrier. In a second example, the RRC parameter 612 may be associated with a UL carrier and a supplement UL carrier. The RRC parameter 612 may indicate to the UE 604 to not multiplex the control information of the UL control channel on the UL data channel on the UL carrier or the supplemental UL carrier. In a third example, the RRC parameter 612 may be associated with a group of UL carriers. The RRC parameter 612 may indicate to the UE 604 to not multiplex the control information of the UL control channel on the UL data channel in any of the group of UL carriers. In some examples, the group of UL carriers may share a band, a frequency range, a timing advance group, a cell group, or be part of a user equipment. By associating the RRC parameter 612 with a group of UL carriers, the signaling overhead may be reduced as compared to associating the RRC parameter 612 with a single UL carrier. In a fourth example, the RRC parameter 612 may be associated with a cell group. The RRC parameter 612 may indicate to the UE 604 to not multiplex the control information of the UL control channel on the UL data channel in any of the SCells associated with the cell group other than the cell transmitting the UL control channel.

In some aspects, the UE 604 may configure 614 the UL data channel and the UL control channel for the overlapping transmission based on the RRC parameter. After configuration, the UE 604 may refrain from transmitting the control information on the UL data channel. The UE 604 may transmit 616 the control information in a first slot of the UL control channel, and transmit 618 the data information in a second slot of the UL data channel that overlaps, in whole or in part, the first slot in time.

Figure 7:
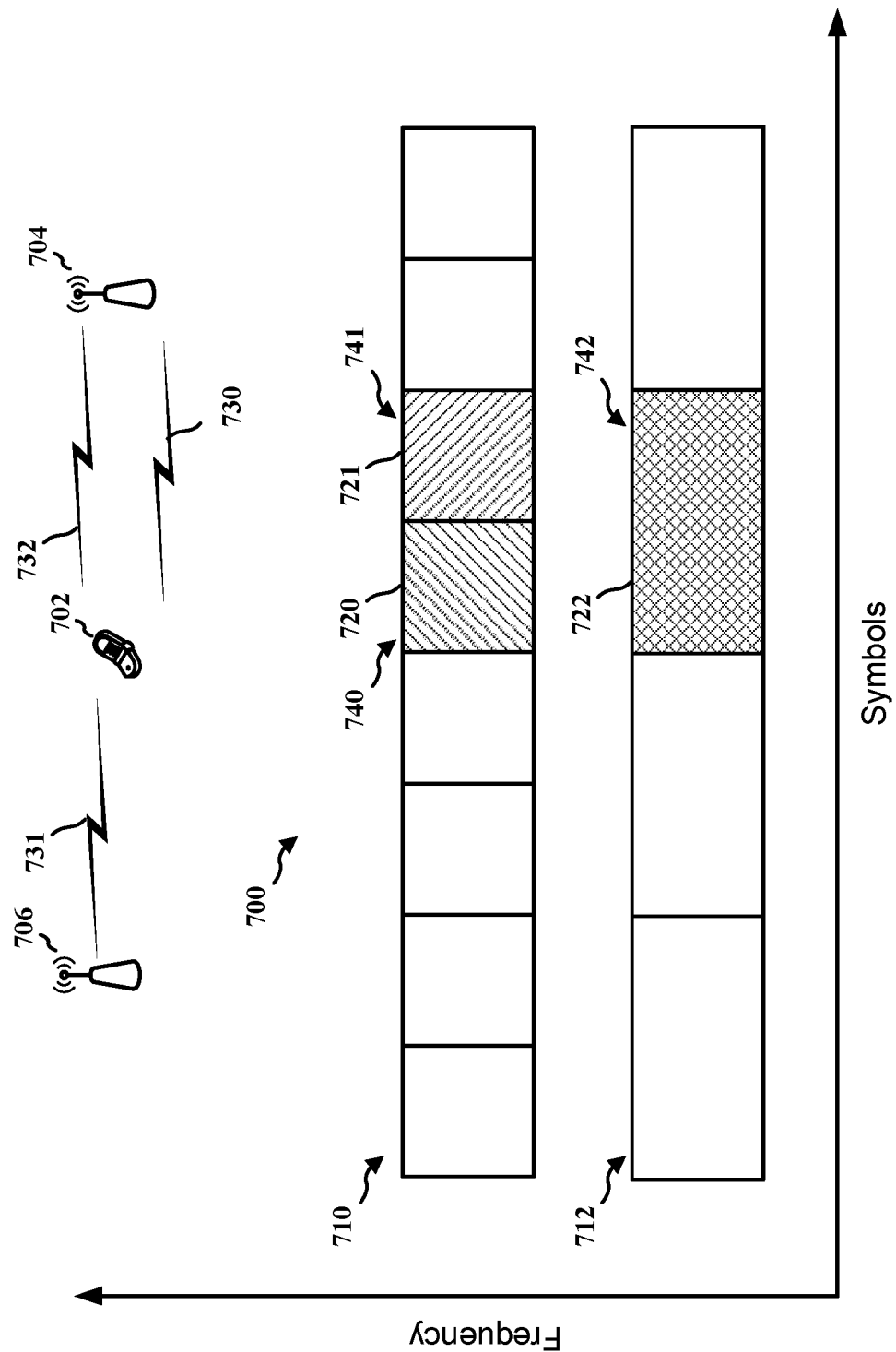
FIG. 7 is a graph of frequency relative to symbols including an example of overlapping transmission of multiple control information on an uplink control channel and data information on an uplink data channel, including an inset schematic diagram representing the transmissions between the UE and two base stations.

FIG. 7 is a graph of frequency relative to symbols including an example of overlapping transmission of multiple control information on an UL control channel and data information on an UL data channel, including an inset schematic diagram representing the transmissions between the UE and two base stations. In particular, FIG. 7 illustrates a first example of an overlapping transmission 700 based on multiple transmission/reception points (M-TRPs or multi-TRPs) and/or in a M-TRP architecture. For example, in an aspect, one or more base stations may be referred to as a M-TRP device capable of communicating with a UE on one carrier or on multiple different carriers. Correspondingly, a UE may communicate on one or more different carriers with one or more M-TRP devices. Such operations may be implemented in one or more coordinated multi-point transmission (CoMP) schemes in a wireless network, such as but not limited to a 5G NR technology network. In one aspect, a UE 702 may transmit the overlapping transmission 700 that includes data information 732 on an UL data channel 722 and first control information 730 on a first UL control channel 720 to a first base station 704, such as a gNB or eNB. The UE 702 may transmit second control information 731 on a second UL control channel 721 to a second base station 706, such as a gNB or NB. In some aspects, the base stations 704 or 706 may allocate at least a portion of a first set of resources 710 associated with a first cell or at least a portion of a second set of resources 712 associated with a second cell to the UE 702 for UL transmissions. In some aspects, the first cell may operate on a first CC, for example, a PCell. The first cell may have a first subcarrier spacing, such as 30 kilohertz (kHz), among other example subcarrier spacings. The second cell may operate on a second CC, for example, a SCell. The second cell may have a second subcarrier spacing, such as 15 kHz, among other example subcarrier spacings.

During operation, the UE 702 may transmit the first control information 730 on the first UL control channel 720, the second control information 731 on the second UL control channel 721, and the data information 732 on the UL data channel 722. In some aspects, at least a slot 740 in the first UL control channel 720 may overlap, in symbol, partially or fully, with at least a second slot 742 in the UL data channel 722. At least a third slot 741 in the second UL control channel 721 may overlap, in symbol, with at least the second slot 742 in the UL data channel 722. The second slot 742 and the third slot 741 of the UL data channel 722 may be mapped into the same slot or different slots. In some examples, the first UL control channel 720 and the second UL control channel 721 may be PUCCHs and the UL data channel 722 may be a PUSCH. The first control information 730 or the second control information 731 may include HARQ ACK/NACK feedback, channel state information (CSI), p-CSI, a scheduling request, a channel quality indicator, or other control information. Notably, the first control information 730 may be associated with the first UL control channel 720 or the UL data channel 722. The second control information 731 may be associated with the second UL control channel 721 or the UL data channel 722.

Figure 8:
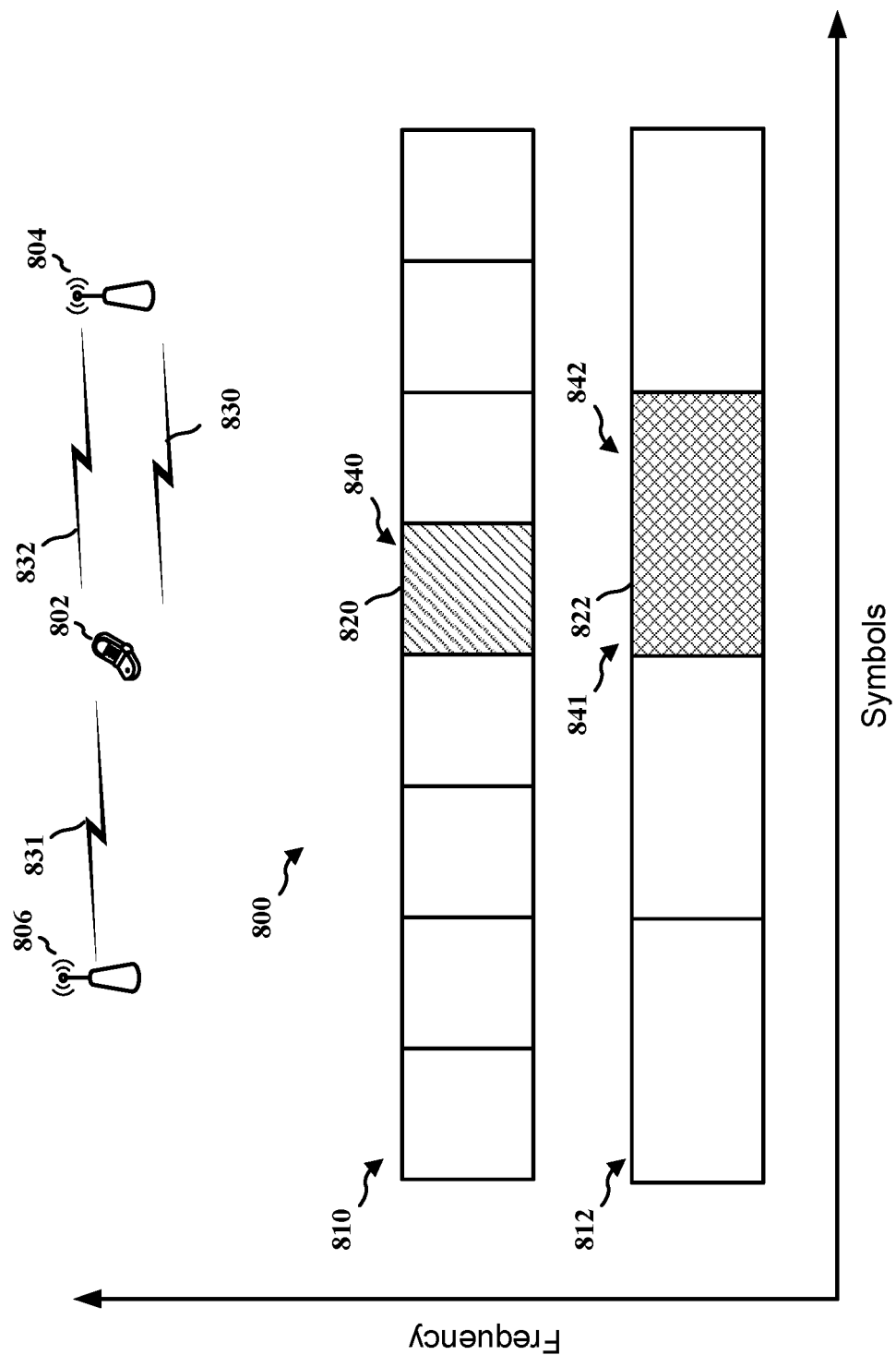
FIG. 8 is a graph of frequency relative to symbols including an example of overlapping transmission of control information on an uplink control channel, and control information and data information on an uplink data channel, including an inset schematic diagram representing the transmissions between the UE and two base stations.

FIG. 8 is a graph of frequency relative to symbols including an example of overlapping transmission of control information on an UL control channel, and control information and data information on an UL data channel, including an inset schematic diagram representing the transmissions between the UE and two base stations. In particular, FIG. 8 illustrates a second example of an overlapping transmission 800 based on M-TRPs and/or in a M-TRP architecture. In one aspect, the UE 802 may transmit the overlapping transmission 800 that includes data information 832 on an UL data channel 822 and first control information 830 on an UL control channel 820 to a first base station 804, such as a gNB or eNB. The UE 802 may transmit second control information 831 on the UL data channel 822 to a second base station 806, such as a gNB or NB. In some aspects, the base stations 804 or 806 may allocate at least a portion of a first set of resources 810 associated with a first cell or at least a portion of a second set of resources 812 associated with a second cell to the UE 802 for UL transmissions. In some aspects, the first cell may operate on a first CC, for example, a PCell. The first cell may have a first subcarrier spacing, such as 30 kilohertz (kHz), among other example subcarrier spacings. The second cell may operate on a second CC, for example, a SCell. The second cell may have a second subcarrier spacing, such as 15 kHz, among other example subcarrier spacings.

During operation, the UE 802 may transmit the first control information 830 on the UL control channel 820, and the second control information 831 and the data information 832 on the UL data channel 822. In some aspects, at least a slot 840 in the UL control channel 820 may overlap, in symbol, partially or fully, with at least a first slot 841 in the UL data channel 822 for the transmission of the second control information 831 or a second slot 842 in the UL data channel 822 for the transmission of the data information 832. The first slot 841 and the second slot 842 of the UL data channel 822 may be mapped into the same slot or different slots. In some examples, the UL control channel 820 may be a PUCCH and the UL data channel 822 may be a PUSCH. In some aspects, the control information 830 may include HARQ ACK/NACK feedback, channel state information (CSI), p-CSI, a scheduling request, a channel quality indicator, or other control information. Notably, the first control information 830 may be associated with the UL control channel 820 or the UL data channel 822. The second control information 831 may be associated with the UL control channel 820 or the UL data channel 822.

Figure 9:
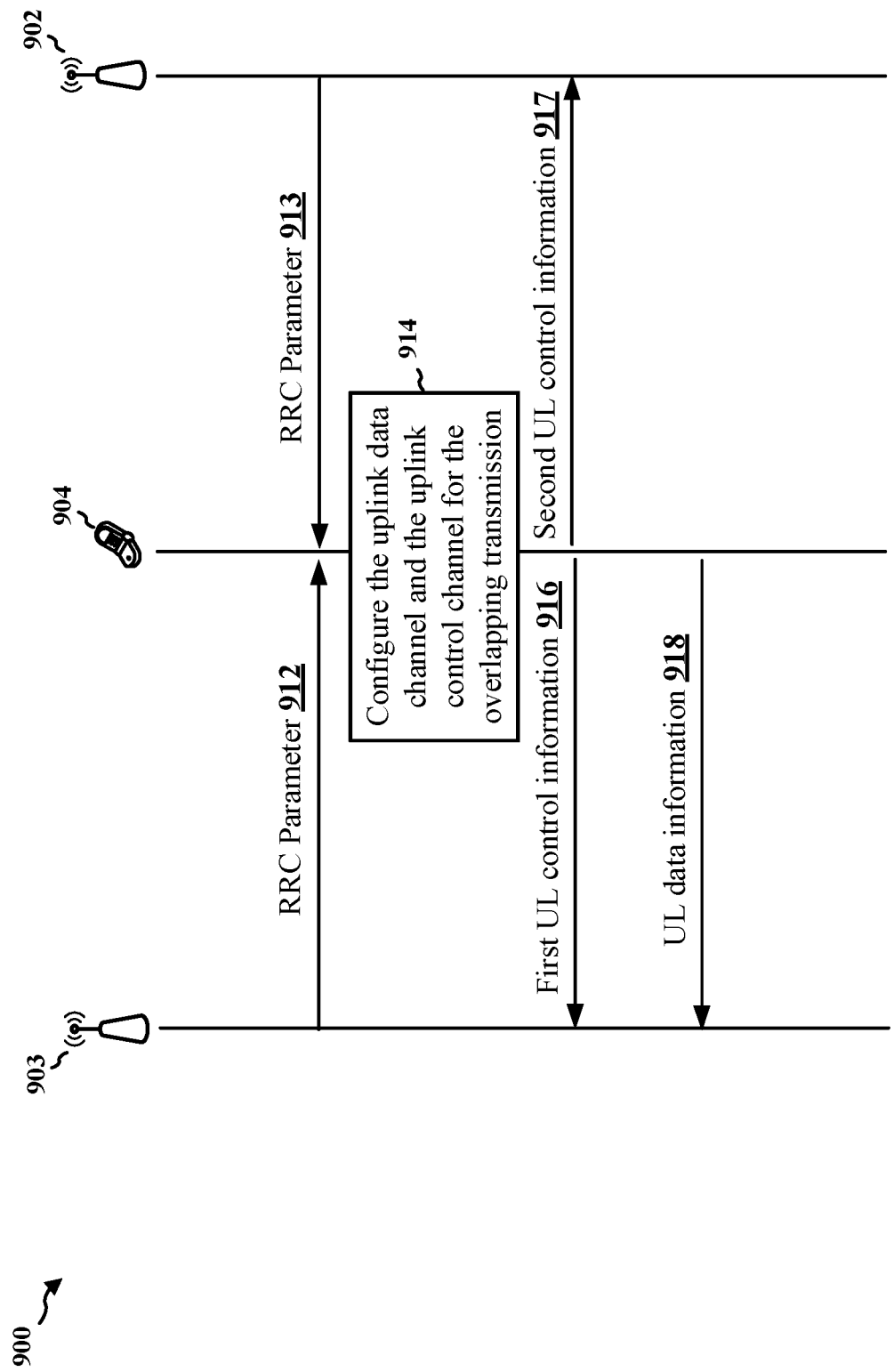
FIG. 9 is a communication flow between two base stations and a UE that supports overlapping transmission of data information and control information in accordance with aspects of the present disclosure.

FIG. 9 shows an example communication flow 900 between two base stations 902 and 903 and a UE 904 that supports overlapping transmissions of data information and control information in accordance with aspects of the present disclosure. In particular, FIG. 9 illustrates a communication flow 900 illustrates the overlapping transmissions of data information and control information to multiple TRPs and/or in an M-TRP architecture. The first base station 902, which may be a gNB or eNB, the second base station 903, which may be a gNB or eNB, and the UE 904 may be configured to communicate in a RAN according to one or more standards defined for the RAN, such as one or more 3GPP standards defined for 5G NR.

In some aspects, the first base station 902 may transmit a RRC parameter 912 to the UE 904. The RRC parameter 912 may include one or more bits indicating to the UE 904 to refrain from transmitting some or all of the control information in an UL data channel during an overlapping transmission of the UL data channel with the UL control channel.

In some aspects, the UE 904 may configure 914 the UL data channel and the UL control channel for the overlapping transmission based on the RRC parameter. After configuration, the UE 904 may refrain from transmitting some or all of the control information on the UL data channel. In some aspects, the UE 904 may transmit 916 first control information in a first slot of the UL control channel and may transmit 918 the data information in a second slot of the UL data channel that overlaps, in whole or in part, the first slot in time.

Figure 10:
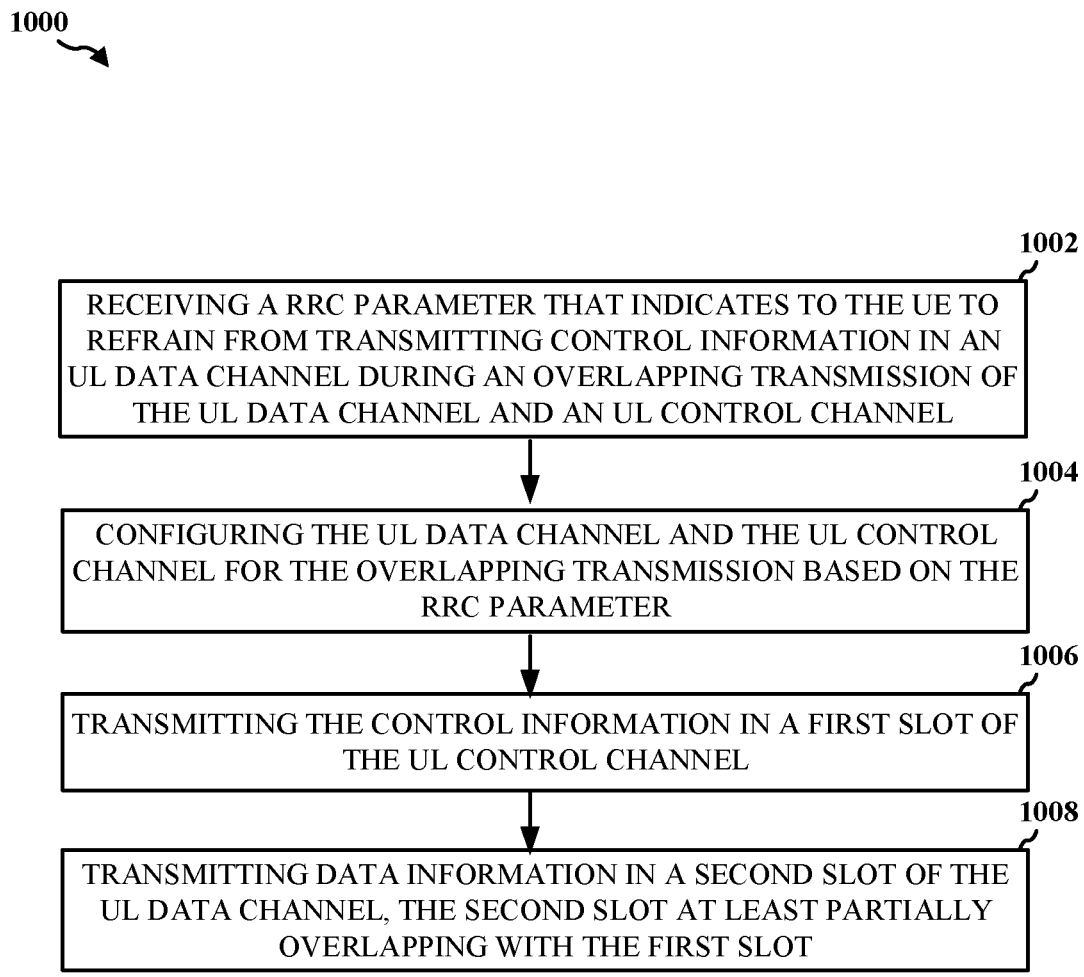
FIG. 10 is a flowchart of an example of a method of wireless communication that supports overlapping transmission of control information and data information in accordance with some aspects of the present disclosure.

FIG. 10 is a flowchart of an example of a method of wireless communication that supports overlapping transmission of control information and data information in accordance with some aspects of the present disclosure. In particular, FIG. 10 includes a method 1000 of wireless communication that may be performed by a UE (such as the UEs 104, 350, 402, 502, 604, 702, 802, or 904; the apparatus 1202; the processing system 1214, which may include the memory 360 and which may be the entire UE 104, 350, 402, 502, 604, 702, 802, or 904 or a component of the UE 104, 350, 402, 502, 604, 702, 802, or 904, such as the TX processor 368, the RX processor 356, or the controller/processor 359).

At 1002, in some aspects, the UE may receive a RRC parameter that indicates to the UE to refrain from transmitting control information in an uplink data channel during an overlapping transmission of the uplink data channel and an uplink control channel. As shown in FIGS. 4-6, the UE 604 may receive the RRC parameter 612 from the base station 602. The RRC parameter 612 may be associated with a single uplink carrier, a group of uplink carriers, or a first cell different than a second cell associated with the uplink control channel.

Specifically, in an aspect, the RRC parameter 612 may include one or more bits. The one or more bits may indicate to the UE 604 to refrain from transmitting the control information, such as the control information 430 or 530, on the UL data channel, such as the UL data channels 422, 522, or 524, during the overlapping transmission of the uplink control channel, such as the UL control channels 420 or 520, and the uplink data channel, such as the UL data channels 422, 522, or 524.

As shown in FIGS. 7-9, the UE 904 may receive the RRC parameters 912 or 913 from the base stations 902 or 903. The RRC parameters 912 or 913 may each be associated with a single uplink carrier, a group of uplink carriers, or a first cell different than a second cell associated with the uplink control channel.

Specifically, in an aspect, the RRC parameters 912 or 913 may each include one or more bits. The one or more bits may indicate to the UE 1004 to refrain from transmitting the control information, such as the control information 730, 731, or 830, on the UL data channel, such as the UL data channels 722 or 822, during the overlapping transmission of the uplink control channel, such as the UL control channels 720, 721, or 820, and the uplink data channel, such as the UL data channels 722 or 822.

For example, 1002 may be performed by one or more of the apparatus 1102, the reception component 1104, the antenna 352, the receiver 354RX, the RX processor 356, or the controller/processor 359. The apparatus 1102, the reception component 1104, the antenna 352, the receiver 354RX, the RX processor 356, or the controller/processor 359 may be configured to or may provide means for receiving a RRC parameter that indicates to the UE to refrain from transmitting control information in an uplink data channel during an overlapping transmission of the uplink data channel and an uplink control channel.

At 1004, in some aspects, the UE may configure the uplink data channel and the uplink control channel for the overlapping transmission based on the RRC parameter. As shown in FIGS. 4-6, the UE 604 may configure 614 the uplink data channel, such as the UL data channels 422, 522, or 524, and the uplink control channel, such as the UL control channels 420 or 520, for the overlapping transmission based on the RRC parameter, such as the RRC parameter 612. Particularly, the UE 604 may configure the UL data channels 422, 522, or 524 to refrain from transmitting the control information 430 or 530 on the UL data channels 422, 522, or 524.

As shown in FIGS. 7-9, the UE 904 may configure 914 the uplink data channel, such as the UL data channels 722 or 822, and the uplink control channel, such as the UL control channels 720, 721, or 820, for the overlapping transmission based on the RRC parameter, such as the RRC parameters 912 or 913. Particularly, the UE 904 may configure the UL data channels 722 or 822 to refrain from transmitting the control information 730, 731, or 830 on the UL data channels 722 or 822.

For example, 1004 may be performed by one or more of the apparatus 1102, the configuration component 1106, or the controller/processor 359. The apparatus 1102, the configuration component 1206, or the controller/processor 359 may be configured to or may provide means for configuring the uplink data channel and the uplink control channel for the overlapping transmission based on the RRC parameter.

At 1006, in some aspects, the UE may transmit the control information in a first slot of the uplink control channel. As shown in FIGS. 4-6, the UE 604 may transmit the control information, such as the control information 430 or 530, in a first slot, such as the slots 440 or 540, of the uplink control channel, such as the UL control channel 420 or 520. As shown in FIGS. 7-9, the UE 904 may transmit the control information, such as the control information 730 or 731, in a first slot, such as the slots 740, 741, or 840, of the uplink control channel, such as the UL control channels 720, 721, or 820.

For example, 1006 may be performed by one or more of the apparatus 1102, the transmission component 1108, the transmitter 354TX, the TX processor 368, or the controller/processor 359. The apparatus 1102, the transmission component 1208, the transmitter 354TX, the TX processor 368, or the controller/processor 359 may be configured to or may provide means for transmitting the control information in a first slot of the uplink control channel.

Finally, at 1008, in some aspects, the UE may transmit data information in a second slot of the uplink data channel, the second slot at least partially overlapping with the first slot. As shown in FIGS. 4-6, the UE 604 may transmit the data information, such as the data information 432, 532, or 534, in a second slot, such as the slots 442, 542, or 544, of the uplink data channel, such as the UL data channel 422, 522, or 524. The second slot, such as the slots 442, 542, or 544, at least partially overlaps with the first slot, such as the slots 440 or 540. As shown in FIGS. 7-9, the UE 904 may transmit the data information, such as the data information 732, in a second slot, such as the slots 742 or 842, of the uplink data channel, such as the UL data channels 722 or 822. The second slot, such as the slots 742 or 842, at least partially overlaps with the first slot, such as the slots 740, 741, or 840.

For example, 1008 may be performed by one or more of the apparatus 1102, the transmission component 1108, the transmitter 354TX, the TX processor 368, or the controller/processor 359. The apparatus 1102, the transmission component 1108, the transmitter 354TX, the TX processor 368, or the controller/processor 359 may be configured to or may provide means for transmitting data information in a second slot of the uplink data channel, the second slot at least partially overlapping with the first slot.

In an alternative or additional aspect, the method 1000 may further include transmitting second control information in a third slot via the second cell, wherein the control information is first control information. For example, the transmitting of the second control information may include transmitting the second control information in the uplink data channel, wherein the second slot and the third slot at least partially overlaps with the first slot. Also, in some aspects of this case, the second slot and the third slot are the same slot. In other aspects, transmitting the second control information further includes transmitting the second control information in the uplink control channel, wherein the second slot at least partially overlaps with the first slot and with the third slot.

Figure 11:
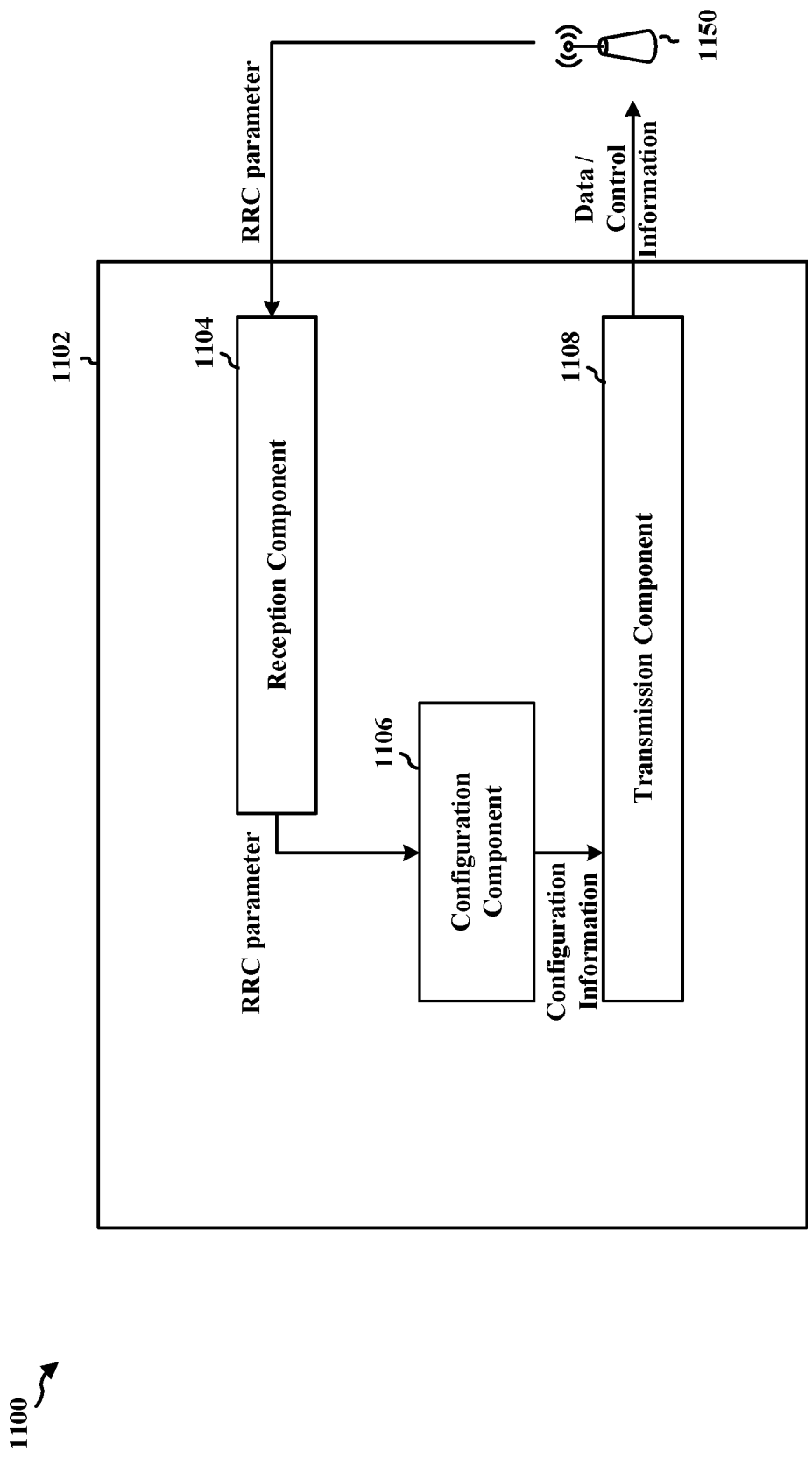
FIG. 11 is a conceptual data flow diagram of an example of a data flow between different components in an example apparatus that supports overlapping transmission of control information and data information in accordance with some aspects of the present disclosure.

FIG. 11 is a conceptual data flow diagram of an example of a data flow between different components in an example apparatus that supports overlapping transmission of control information and data information in accordance with some aspects of the present disclosure. In particular, FIG. 11 includes conceptual data flow diagram 1100 of a data flow between different means or components of an example apparatus 1102. The apparatus may be a UE. The apparatus 1102 includes a reception component 1104 that receives RRC parameters from the base station 1150, such as described in connection with block 1002 of FIG. 10. The apparatus 1102 includes a configuration component 1106 that configures data channel and control channel for overlapping transmission, such as described in connection with block 1004 of FIG. 10. The apparatus 1102 includes a transmission component 1108 that transmits data and control information to the base station 1150, such as described in connection with blocks 1006 and 1008 of FIG. 10.

The apparatus 1102 may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
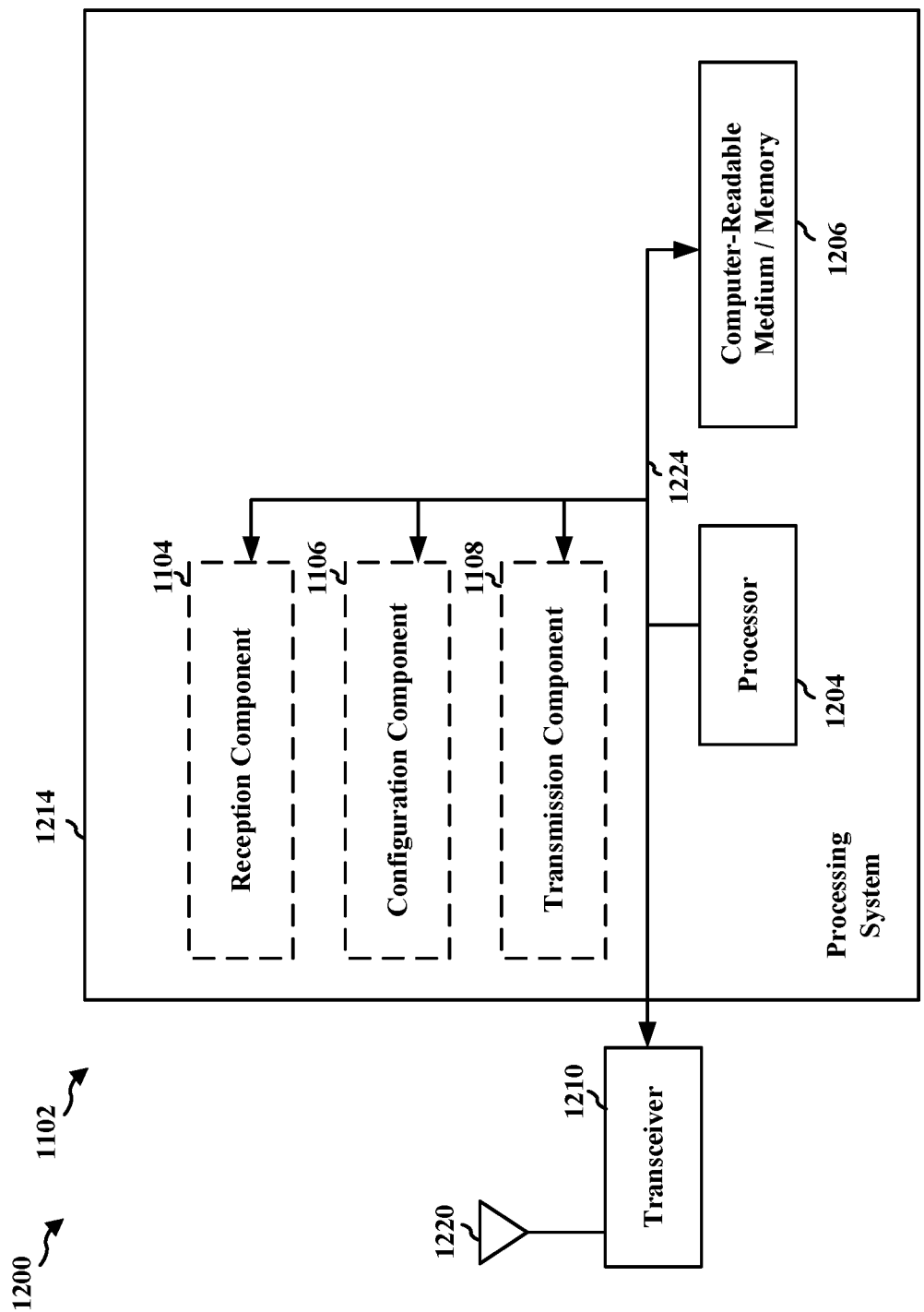
FIG. 12 is a diagram of an example of a hardware implementation for an apparatus employing a processing system that supports overlapping transmission of control information and data information in accordance with some aspects of the present disclosure.

FIG. 12 is a diagram of an example of a hardware implementation for an apparatus employing a processing system that supports overlapping transmission of control information and data information in accordance with some aspects of the present disclosure. In particular, diagram 1200 includes an example of a hardware implementation for the apparatus 1102 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors or hardware components, represented by the processor 1204, the components 1204, 1206, and 1208, and the computer-readable medium/memory 1206. The bus 1224 may also link various other circuits such as timing sources, peripherals, voltage regulators, and power management circuits.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1204. In addition, the transceiver 1210 receives information from the processing system 1214, specifically the transmission component 1208, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described herein for any particular apparatus. The computer-readable medium/memory 1206 may also be used for storing data that is manipulated by the processor 1204 when executing software. The processing system 1214 further includes at least one of the components 1204, 1206, and 1208. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 or at least one of the TX processor 368, the RX processor 356, and the controller/processor 359. Alternatively, the processing system 1214 may be the entire UE (such as see 350 of FIG. 3).

In one configuration, the apparatus 1102 for wireless communication includes means for receiving a radio resource control (RRC) parameter that indicates to the UE to refrain from transmitting control information in an uplink data channel during an overlapping transmission of the uplink data channel and an uplink control channel, means for configuring the uplink data channel and the uplink control channel for the overlapping transmission based on the RRC parameter, means for transmitting the control information in a first slot of the uplink control channel, means for transmitting data information in a second slot of the uplink data channel, the second slot at least partially overlapping with the first slot, transmitting second control information in a third slot via the second cell, wherein the control information is first control information, means for transmitting the second control information in the uplink data channel, wherein the second slot and the third slot at least partially overlaps with the first slot, and means for transmitting the second control information in the uplink control channel, wherein the second slot at least partially overlaps with the first slot and with the third slot. The aforementioned means may be one or more of the aforementioned components of the apparatus 1102 or the processing system 1214 of the apparatus 1102 configured to perform the functions recited by the aforementioned means. As described herein, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
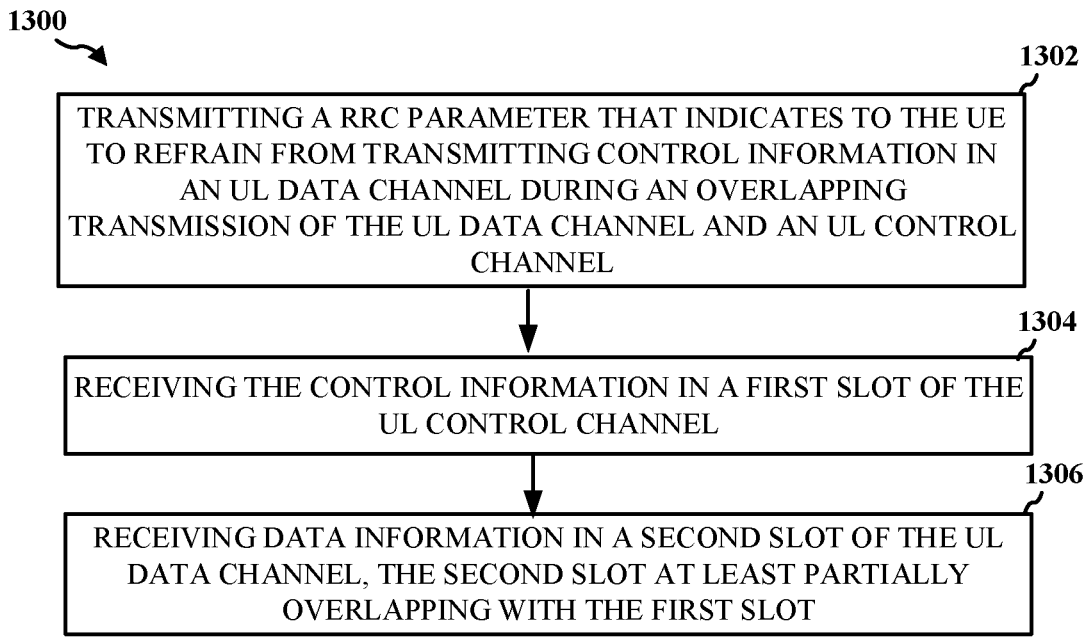
FIG. 13 is a flowchart of an example of a method of wireless communication that supports overlapping transmission of control information and data information in accordance with some aspects of the present disclosure.

FIG. 13 is a flowchart of an example of a method of wireless communication that supports overlapping transmission of control information and data information in accordance with some aspects of the present disclosure. The method 1300 may be performed by a base station (such as the base stations 102, 310, 404, 504, 602, 704, 706, 804, 806, 902 or 903; the apparatus 1402; the processing system 1514, which may include the memory 376 and which may be the entire base station 102, 310, 404, 504, 602, 704, 706, 804, 806, 902 or 903 or a component of the base station 102, 310, 404, 504, 602, 704, 706, 804, 806, 902 or 903, such as the TX processor 318, the RX processor 370, or the controller/processor 375.

At 1302, in some aspects, the base station may transmit a RRC parameter that indicates to the UE to refrain from transmitting control information in an uplink data channel during an overlapping transmission of the uplink data channel and an uplink control channel. As shown in FIGS. 4-6, the base station 602 may transmit the RRC parameter 612 from the base station 602. The RRC parameter 612 may be associated with a single uplink carrier, a group of uplink carriers, or a first cell different than a second cell associated with the uplink control channel.

Specifically, in an aspect, the RRC parameter 612 may include one or more bits. The one or more bits may indicate to the UE 604 to refrain from transmitting the control information, such as the control information 430 or 530, on the UL data channel, such as the UL data channels 422, 522, or 524, during the overlapping transmission of the uplink control channel, such as the UL control channels 420 or 520, and the uplink data channel, such as the UL data channels 422, 522, or 524.

As shown in FIGS. 7-9, the base station 704 or 706 may transmit the RRC parameters 912 or 913 to the UE 702. The RRC parameters 912 or 913 may each be associated with a single uplink carrier, a group of uplink carriers, or a first cell different than a second cell associated with the uplink control channel.

Specifically, in an aspect, the RRC parameters 912 or 913 may each include one or more bits. The one or more bits may indicate to the UE 1004 to refrain from transmitting the control information, such as the control information 730, 731, or 830, on the UL data channel, such as the UL data channels 722 or 822, during the overlapping transmission of the uplink control channel, such as the UL control channels 720, 721, or 820, and the uplink data channel, such as the UL data channels 722 or 822.

For example, 1302 may be performed by one or more of the apparatus 1402, the transmission component 1406, the antenna 320, the transmitter 318TX, the TX processor 316, or the controller/processor 370. The apparatus 1402, the transmission component 1406, the antenna 320, the transmitter 318TX, the TX processor 316, or the controller/processor 370 may be configured to or may provide means for transmitting a RRC parameter that indicates to the UE to refrain from transmitting control information in an uplink data channel during an overlapping transmission of the uplink data channel and an uplink control channel.

At 1304, in some aspects, the base station may receive the control information in a first slot of the uplink control channel. As shown in FIGS. 4-6, the base station 602 may receive the control information, such as the control information 430 or 530, in a first slot, such as the slots 440 or 540, of the uplink control channel, such as the UL control channel 420 or 520. As shown in FIGS. 7-9, the base stations 704 or 706 may receive the control information, such as the control information 730 or 731, in a first slot, such as the slots 740, 741, or 840, of the uplink control channel, such as the UL control channels 720, 721, or 820.

For example, 1304 may be performed by one or more of the apparatus 1402, the reception component 1406, the receiver 318RX, the RX processor 370, or the controller/processor 375. The apparatus 1402, the reception component 1406, the receiver 318RX, the RX processor 370, or the controller/processor 375 may be configured to or may provide means for receiving the control information in a first slot of the uplink control channel.

Finally, at 1306, in some aspects, the base station may receive data information in a second slot of the uplink data channel, the second slot at least partially overlapping with the first slot. As shown in FIGS. 4-6, the base station 602 may receive the data information, such as the data information 432, 532, or 534, in a second slot, such as the slots 442, 542, or 544, of the uplink data channel, such as the UL data channel 422, 522, or 524. The second slot, such as the slots 442, 542, or 544, at least partially overlaps with the first slot, such as the slots 440 or 540. As shown in FIGS. 7-9, the base stations 704 or 706 may receive the data information, such as the data information 732, in a second slot, such as the slots 742 or 842, of the uplink data channel, such as the UL data channels 722 or 822. The second slot, such as the slots 742 or 842, at least partially overlaps with the first slot, such as the slots 740, 741, or 840.

For example, 1008 may be performed by one or more of the apparatus 1402, the reception component 1406, the receiver 318RX, the RX processor 370, or the controller/processor 375. The apparatus 1402, the reception component 1406, the receiver 318RX, the RX processor 370, or the controller/processor 375 may be configured to or may provide means for transmitting data information in a second slot of the uplink data channel, the second slot at least partially overlapping with the first slot.

Figure 14:
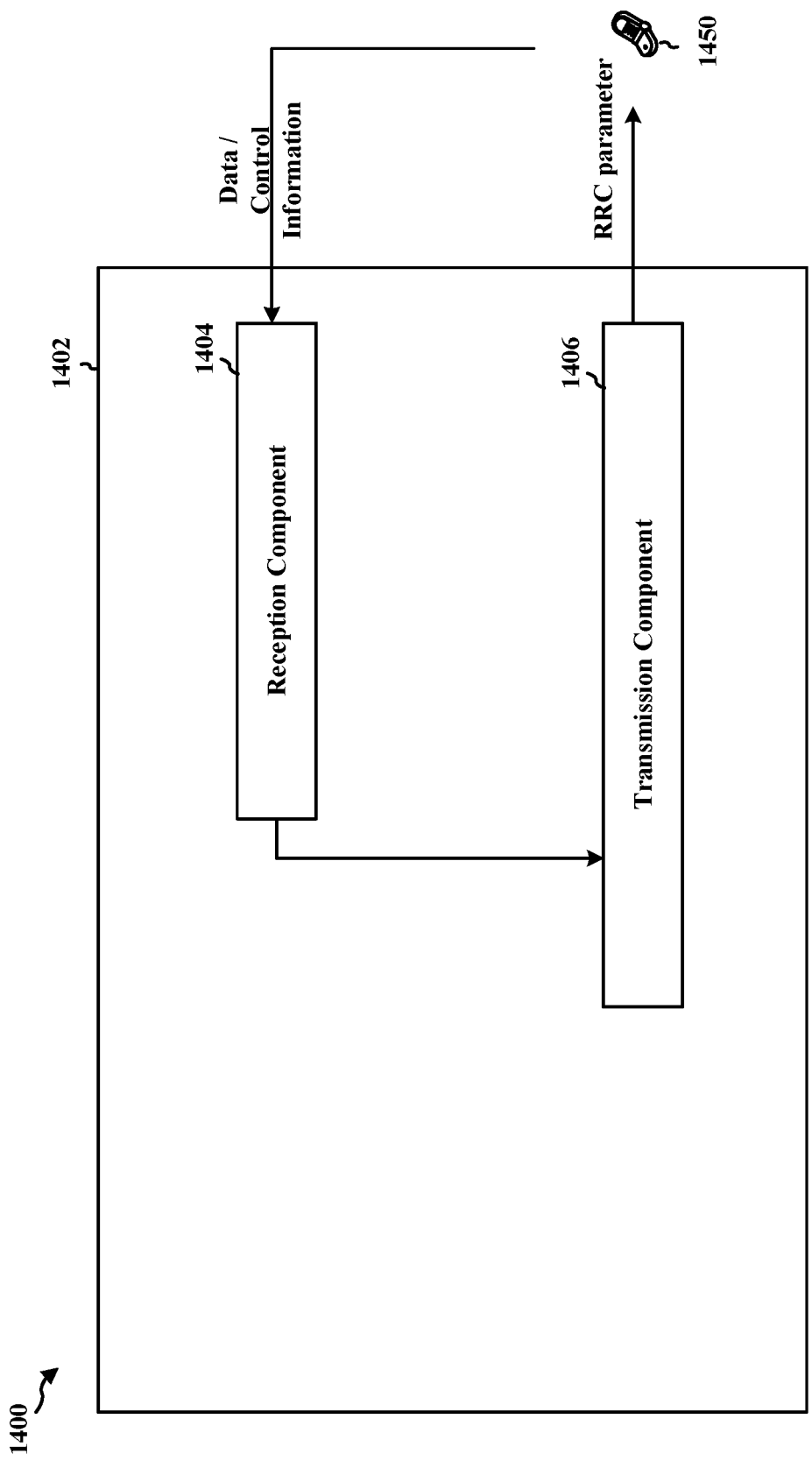
FIG. 14 is a conceptual data flow diagram of an example of a data flow between different components in an example apparatus that supports overlapping transmission of control information and data information in accordance with some aspects of the present disclosure.

FIG. 14 is a conceptual data flow diagram of an example of a data flow between different components in an example apparatus that supports overlapping transmission of control information and data information in accordance with some aspects of the present disclosure. In particular, FIG. 14 includes conceptual data flow diagram 1400 of a data flow between different means or components of an example apparatus 1402. The apparatus may be a base station. The apparatus 1402 includes a reception component 1404 that receives data information or control information from the UE 1450, such as described in connection with blocks 1304 or 1306 of FIG. 13. The apparatus 1402 includes a transmission component 1406 that transmits RRC parameters to the UE 1450, such as described in connection with block 1302 of FIG. 13.

The apparatus 1402 may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
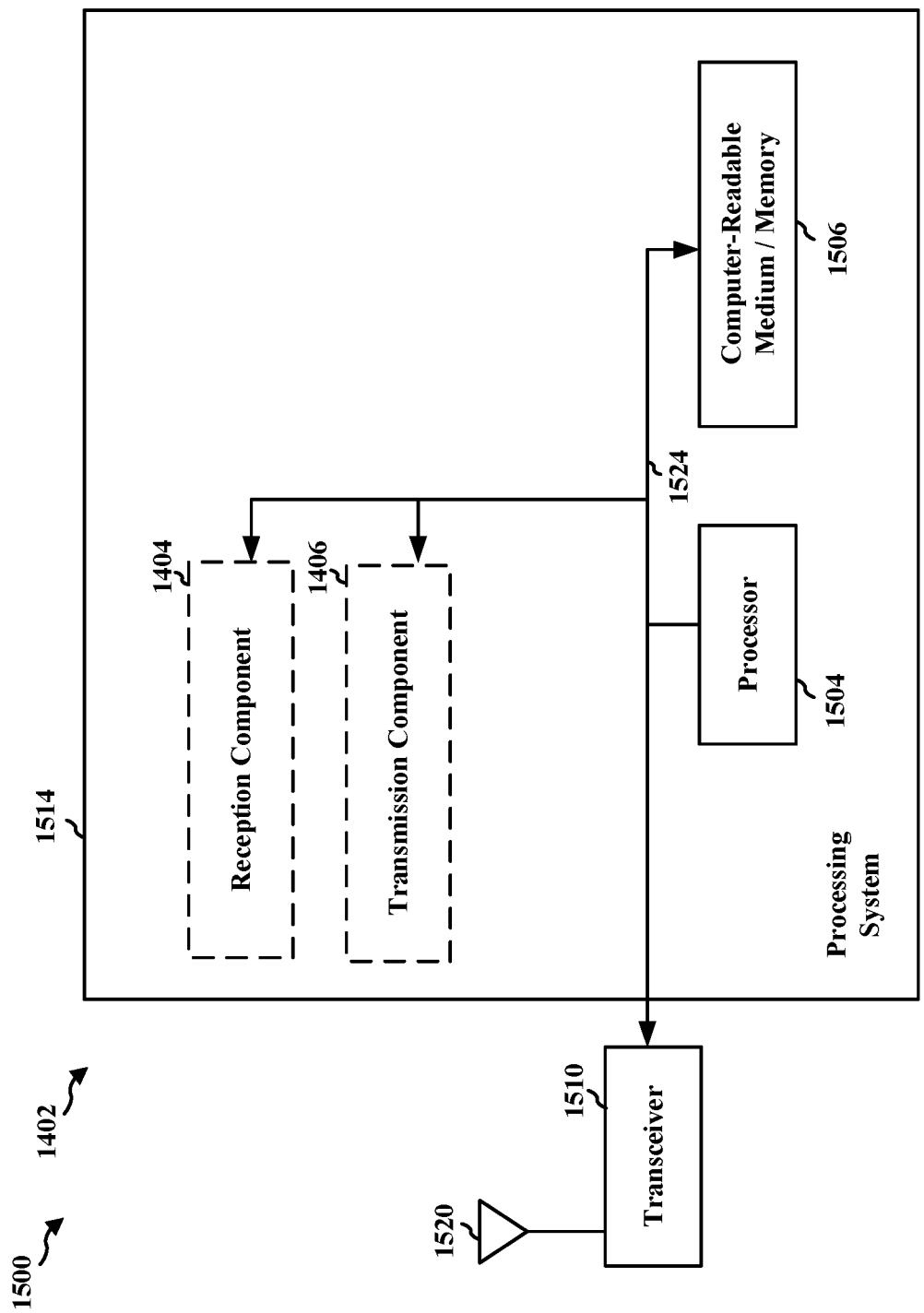
FIG. 15 is a diagram of an example of a hardware implementation for an apparatus employing a processing system that supports overlapping transmission of control information and data information in accordance with some aspects of the present disclosure.

FIG. 15 is a diagram of an example of a hardware implementation for an apparatus employing a processing system that supports overlapping transmission of control information and data information in accordance with some aspects of the present disclosure. In particular, diagram 1500 includes an example of a hardware implementation for the apparatus 1402 employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors or hardware components, represented by the processor 1504, the components 1504, 1506, and 1508, and the computer-readable medium/memory 1506. The bus 1524 may also link various other circuits such as timing sources, peripherals, voltage regulators, and power management circuits.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1504. In addition, the transceiver 1510 receives information from the processing system 1514, specifically the transmission component 1508, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described herein for any particular apparatus. The computer-readable medium/memory 1506 may also be used for storing data that is manipulated by the processor 1504 when executing software. The processing system 1514 further includes at least one of the components 1504, 1506, and 1508. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 or at least one of the TX processor 318, the RX processor 370, and the controller/processor 375. Alternatively, the processing system 1514 may be the entire base station (such as see 310 of FIG. 3).

In one configuration, the apparatus 1402 for wireless communication includes means for transmitting a RRC parameter that indicates to the UE to refrain from transmitting control information in an uplink data channel during an overlapping transmission of the uplink data channel and an uplink control channel, means for receiving the control information in a first slot of the uplink control channel, means for receiving data information in a second slot of the uplink data channel, the second slot at least partially overlapping with the first slot. The aforementioned means may be one or more of the aforementioned components of the apparatus 1102 or the processing system 1214 of the apparatus 1102 configured to perform the functions recited by the aforementioned means. As described herein, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
    receiving a radio resource control (RRC) configuration including one or more RRC parameters that indicate to the UE to enable overlapping transmission of a physical uplink control channel (PUCCH) and a physical uplink shared channel (PUSCH) for a PUCCH group;
    configuring the PUSCH and the PUCCH for the overlapping transmission based on the one or more RRC parameters;
    transmitting uplink control information (UCI) in a first slot of the PUCCH; and
    transmitting data information in a second slot of the PUSCH, the second slot at least partially overlapping with the first slot.

2. The method of claim 1, wherein the one or more RRC parameters indicate one or more uplink carriers are one or more uplink data carriers, a group of uplink carriers is a group of uplink data carriers, or a first cell includes the one or more uplink data carriers, wherein the first cell is different than a second cell associated with the PUCCH.

3. The method of claim 1, wherein the PUCCH is associated with a first cell and the PUSCH is associated with a second cell different than the first cell.

4. The method of claim 3, further comprising:
    receiving a first control resource set (CORESET) having a first CORESET index and a second CORESET having a second CORESET index;
    detecting a first downlink control information (DCI) format in a first physical downlink control channel (PDCCH) received in the first CORESET and a second DCI format in a second PDCCH received in the second CORESET;
    triggering the transmission of the PUCCH associated with the first cell based on detecting the first DCI format; and
    triggering the transmission of the PUSCH associated with the second cell based on detecting the second DCI format.

5. The method of claim 3, wherein the first cell is a Primary Cell (PCell) or a Primary Secondary Cell (PSCell) and the second cell is a Secondary Cell (SCell).

6. The method of claim 3, further comprising transmitting second control information in a third slot via the second cell.

7. The method of claim 6, wherein transmitting the second control information comprises transmitting the second control information in the PUSCH, wherein the second slot and the third slot at least partially overlap with the first slot.

8. The method of claim 6, wherein transmitting the second control information further comprises transmitting the second control information in the PUCCH, wherein the second slot at least partially overlaps with the first slot and with the third slot.

9. The method of claim 1, wherein the one or more RRC parameters comprise a 1-bit RRC parameter that indicates to the UE to enable overlapping transmission of the PUCCH and the PUSCH.

10. The method of claim 1, further comprising:
refraining from transmitting the UCI in the PUSCH.

11. The method of claim 1, wherein transmitting the UCI in the first slot of the PUCCH comprises transmitting the UCI in the first slot of the PUCCH based on a CORESET-PoolIndex; and
wherein transmitting the data information in the second slot of the PUSCH comprises transmitting the data information in the second slot of the PUSCH based on the CORESETPoolIndex, the second slot at least partially overlapping with the first slot.

12. A user equipment (UE) for wireless communication, comprising:
a memory; and
one or more processors coupled to the memory, wherein the one or more processors are configured to:
receive a radio resource control (RRC) configuration including one or more RRC parameters that indicate to the UE to enable overlapping transmission of a physical uplink control channel (PUCCH) and a physical uplink shared channel (PUSCH) for a PUCCH group;
configure the PUSCH and the PUCCH for the overlapping transmission based on the one or more RRC parameters;
transmit uplink control information (UCI) in a first slot of the PUCCH; and
transmit data information in a second slot of the PUSCH, the second slot at least partially overlapping with the first slot.

13. The UE of claim 12, wherein the one or more RRC parameters indicate one or more uplink carriers are one or more uplink data carriers, a group of uplink carriers is a group of uplink data carriers, or a first cell includes the one or more uplink data carriers, wherein the first cell is different than a second cell associated with the PUCCH.

14. The UE of claim 12, wherein the PUCCH is associated with a first cell and the PUSCH is associated with a second cell different than the first cell.

15. The UE of claim 14, wherein the one or more processors are configured to:
receive a first control resource set (CORESET) having a first CORESET index and a second CORESET having a second CORESET index;

detect a first downlink control information (DCI) format in a first physical downlink control channel (PDCCH) received in the first CORESET and a second DCI format in a second PDCCH received in the second CORESET;
trigger the transmission of the PUCCH associated with the first cell based on detecting the first DCI format; and
trigger the transmission of the PUSCH associated with the second cell based on detecting the second DCI format.

16. The UE of claim 14, wherein the first cell is a Primary Cell (PCell) or a Primary Secondary Cell (PSCell) and the second cell is a Secondary Cell (SCell).

17. The UE of claim 14, wherein the one or more processors are further configured to transmit second control information in a third slot via the second cell, wherein the UCI is first control information.

18. The UE of claim 17, wherein, to transmit the second control information, the one or more processors are configured to transmit the second control information in the PUSCH, wherein the second slot and the third slot at least partially overlap with the first slot.

19. The UE of claim 17, wherein, to transmit the second control information, the one or more processors are configured to transmit the second control information in the PUCCH, wherein the second slot at least partially overlaps with the first slot and with the third slot.

20. The UE of claim 12, wherein the one or more RRC parameters comprise a 1-bit RRC parameter that indicates to the UE to enable overlapping transmission of the PUCCH and the PUSCH.

21. The UE of claim 12, wherein the one or more processors are configured to:
refrain from transmitting the UCI in the PUSCH.

22. The UE of claim 12, wherein to transmit the UCI in the first slot of the PUCCH, the one or more processors are configured to transmit the UCI in the first slot of the PUCCH based on a CORESETPoolIndex, and
wherein to transmit the data information in the second slot of the PUSCH, the one or more processors are configured to transmit the data information in the second slot of the PUSCH based on the CORESETPoolIndex, the second slot at least partially overlapping with the first slot.

* * * * *